United States Patent
Tanimoto

(10) Patent No.: US 9,407,529 B2
(45) Date of Patent: Aug. 2, 2016

(54) RELAY SERVER AND RELAY COMMUNICATION SYSTEM

(75) Inventor: Yoshifumi Tanimoto, Kyoto (JP)

(73) Assignee: MURATA MACHINERY, LTD., Kyoto (JP)

( * ) Notice: Subject to any disclaimer, the term of this patent is extended or adjusted under 35 U.S.C. 154(b) by 336 days.

(21) Appl. No.: 13/885,821

(22) PCT Filed: Oct. 26, 2011

(86) PCT No.: PCT/JP2011/005957
§ 371 (c)(1),
(2), (4) Date: May 16, 2013

(87) PCT Pub. No.: WO2012/066731
PCT Pub. Date: May 24, 2012

(65) Prior Publication Data
US 2013/0238813 A1    Sep. 12, 2013

(30) Foreign Application Priority Data

Nov. 18, 2010  (JP) ................................. 2010-258259
Nov. 18, 2010  (JP) ................................. 2010-258260
Nov. 18, 2010  (JP) ................................. 2010-258262

(51) Int. Cl.
*G06F 15/173* (2006.01)
*H04L 12/715* (2013.01)
(Continued)

(52) U.S. Cl.
CPC .............. *H04L 45/04* (2013.01); *H04L 45/021* (2013.01); *H04L 63/0236* (2013.01); *H04L 63/0272* (2013.01)

(58) Field of Classification Search
CPC .................................................. H04L 12/4641
USPC ......... 709/201, 203, 238, 239, 240, 242, 217, 709/218, 219
See application file for complete search history.

(56) References Cited

U.S. PATENT DOCUMENTS 6,275,492 B1 * 8/2001 Zhang ........................... 370/392
7,102,996 B1 * 9/2006 Amdahl et al. ............... 370/230
(Continued)

FOREIGN PATENT DOCUMENTS

| JP | 2002-217938 A | 8/2002 |
| JP | 2008-129991 A | 6/2008 |
| WO | 2010/103781 A1 | 9/2010 |

OTHER PUBLICATIONS

Official Communication issued in International Patent Application No. PCT/JP2011/005957, mailed on Dec. 13, 2011.

*Primary Examiner* — Liangche A Wang
*Assistant Examiner* — Kaylee Huang
(74) *Attorney, Agent, or Firm* — Keating & Bennett, LLP

(57) ABSTRACT

A relay server includes a VPN group information storage unit, an address filter information storage unit, and a communication control unit. The VPN group information storage unit stores routing session information indicating identification information of routing apparatuses that define a VPN group and the routing apparatuses that are connected to one another. The address filter information storage unit stores address filter information, which indicates a partner that the routing apparatus is able to designate as a packet destination, in association with identification information of the routing apparatus. The communication control unit is programmed to perform a control to, when a VPN is started in the VPN group, update a content stored in the address filter information storage unit based on the address filter information received from the routing apparatus, and establish a routing session based on the routing session information.

11 Claims, 19 Drawing Sheets

(51) Int. Cl.
*H04L 29/06* (2006.01)
*H04L 12/755* (2013.01)

(56) References Cited

U.S. PATENT DOCUMENTS

| | | | |
|---|---|---|---|
| 7,590,074 B1 * | 9/2009 | Dondeti et al. | 370/254 |
| 7,613,120 B2 * | 11/2009 | Devereux et al. | 370/237 |
| 2005/0135231 A1 * | 6/2005 | Bellovin | 370/216 |
| 2008/0171511 A1 * | 7/2008 | Sumita et al. | 455/7 |
| 2008/0288591 A1 | 11/2008 | Tanimoto | |
| 2008/0298367 A1 | 12/2008 | Furukawa | |
| 2010/0158010 A1 * | 6/2010 | Kang et al. | 370/392 |
| 2012/0008634 A1 | 1/2012 | Tanimoto | |

* cited by examiner

Fig.3

```
<?xml version="1.0" encoding="UTF-8" ?>
-<root>
   -<group id="group-a@relay-server-1.abc.net"
      lastmod="20090402133100" name="GROUP A">      } 511
      <site id="relay-server-1@abc.net" rel="allow"/>
      <site id="relay-server-2@abc.net" rel="allow"/>  } 512
      <site id="relay-server-3@abc.net" rel="allow"/>
      <site id="relay-server-4@abc.net" rel="allow"/>
   </group>
</root>
```

Fig.4

```
<?xml version="1.0" encoding="UTF-8" ?>
-<root>
   -<site id="relay-server-1@abc.net"
      name="RELAY SERVER 1" stat="active">           } 521
      -<node group="group-a@relay-server-1.abc.net"
         id="client-11@relay-server-1.abc.net"
         name="CLIENT 11" site="relay-server-1@abc.net"/>  } 522
   </site>
   -<site id="relay-server-2@abc.net"
      name="RELAY SERVER 2" stat="active">           } 521
      -<node group="group-a@relay-server-1.abc.net"
         id="client-21@relay-server-2.abc.net"
         name="CLIENT 21" site="relay-server-2@abc.net"/>  } 522
   </site>
   -<site id="relay-server-3@abc.net"
      name="RELAY SERVER 3" stat="active">           } 521
      -<node group="group-a@relay-server-1.abc.net"
         id="client-31@relay-server-3.abc.net"
         name="CLIENT 31" site="relay-server-3@abc.net"/>  } 522
   </site>
   -<site id="relay-server-4@abc.net"
      name="RELAY SERVER 4" stat="active">           } 521
      -<node group="group-a@relay-server-1.abc.net"
         id="client-41@relay-server-4.abc.net"
         name="CLIENT 41" site="relay-server-4@abc.net"/>  } 522
   </site>
</root>
```

Fig.5A

```
<?xml version="1.0" encoding="UTF-8" ?>
-<root>
  -<node addr="192.168.1.11"
      group="group-a@relay-server-1.abc.net"
      id="client-11@relay-server-1.abc.net"
      name="CLIENT 11" pass="abc" port="5070">
    </node>
  </root>
```

Fig.5B

```
<?xml version="1.0" encoding="UTF-8" ?>
-<root>
  -<node addr="192.168.2.21"
      group="group-a@relay-server-1.abc.net"
      id="client-21@relay-server-2.abc.net"
      name="CLIENT 21" pass="abc" port="5070">
    </node>
  </root>
```

Fig.5C

```
<?xml version="1.0" encoding="UTF-8" ?>
-<root>
  -<node addr="192.168.3.31"
      group="group-a@relay-server-1.abc.net"
      id="client-31@relay-server-3.abc.net"
      name="CLIENT 31" pass="abc" port="5070">
    </node>
  </root>
```

Fig.5D

```
<?xml version="1.0" encoding="UTF-8" ?>
-<root>
  -<node addr="192.168.4.41"
      group="group-a@relay-server-1.abc.net"
      id="client-41@relay-server-4.abc.net"
      name="CLIENT 41" pass="abc" port="5070">
    </node>
  </root>
```

Fig.6

```
<?xml version="1.0" encoding="UTF-8"?>
-<root>
    -<vnet group="group-a@relay-server-1.abc.net"
        id="vpn-group-1@abc.net"
        lastmod="20090410162500" name="VPN-GROUP 1">      } 541
        <rp id="client-11@relay-server-1.abc.net"/>
        <rp id="client-21@relay-server-2.abc.net"/>        } 542
        <rp id="relay-server-3@abc.net"/>
        <ssn sp="client-11@relay-server-1.abc.net"
            ep="client-21@relay-server-2.abc.net"/>
        <ssn sp="client-11@relay-server-1.abc.net"
            ep="relay-server-3@abc.net"/>                  } 543
        <ssn sp="client-21@relay-server-2.abc.net"
            ep="relay-server-3@abc.net"/>
    </vnet>
</root>
```

Fig.7A

| CLIENT TERMINAL 11 | PROCESSING APPARATUS 12 |
|---|---|
| CLIENT TERMINAL 21 | PROCESSING APPARATUS 22 |
|  | PROCESSING APPARATUS 23 |
| RELAY SERVER 3 | LAN 30 |

Fig.7B

| "client-11@relay-server-1.abc.net" | 192.168.1.12 | PROCESSING APPARATUS 12 |
|---|---|---|
| "client-21@relay-server-2.abc.net" | 192.168.2.22 | PROCESSING APPARATUS 22 |
|  | 192.168.2.23 | PROCESSING APPARATUS 23 |
| "relay-server-3@abc.net" | 192.168.3.0/24 | LAN 30 |

Fig.15A

| CLIENT TERMINAL 11 | PROCESSING APPARATUS 12 |
|---|---|
| CLIENT TERMINAL 41 | PROCESSING APPARATUS 42 |
| RELAY SERVER 3 | LAN 30 |

Fig.15B

| "client-11@relay-server-1.abc.net" | 192.168.1.12 | PROCESSING APPARATUS 12 |
|---|---|---|
| "client-21@relay-server-2.abc.net" | 192.168.4.42 | PROCESSING APPARATUS 42 |
| "relay-server-3@abc.net" | 192.168.3.0/24 | LAN 30 |

Fig.17A

| CLIENT TERMINAL 11 | PROCESSING APPARATUS 12 |
|---|---|
| CLIENT TERMINAL 21 | PROCESSING APPARATUS 22 |
| | PROCESSING APPARATUS 23 |
| RELAY SERVER 3 | PROCESSING APPARATUS 33 |

Fig.17B

| "client-11@relay-server-1.abc.net" | 192.168.1.12 | PROCESSING APPARATUS 12 |
|---|---|---|
| "client-21@relay-server-2.abc.net" | 192.168.2.22 | PROCESSING APPARATUS 22 |
| | 192.168.2.23 | PROCESSING APPARATUS 23 |
| "relay-server-3@abc.net" | 192.168.3.33 | PROCESSING APPARATUS 33 |

RELAY SERVER AND RELAY COMMUNICATION SYSTEM

BACKGROUND OF THE INVENTION

1. Field of the Invention

The present invention relates to a relay server that enables communication to be performed between terminals connected to different LANs (Local Area Networks).

2. Description of the Related Art

Conventionally, a communication technology called a virtual private network (Virtual Private Network, VPN) has been known (for example, see Japanese Patent Application Laid-Open No. 2002-217938). The VPN is used for, for example, performing communication via the internet between terminals that are connected to LANs of a plurality of branch offices (stations) each located in one of a plurality of regions. Use of the VPN enables another LAN located in a distant place to be used as if it is a directly-connected network.

However, this type of system is often rigid, and it is not easy to build an expandable and flexible system. For example, in the communication system disclosed in Japanese Patent Application Laid-Open No. 2002-217938 mentioned above, it is impossible to build a virtual network by using only select portions of apparatuses included in the system. Additionally, even when a virtual network is normally operated at an initial stage, there is a possibility that it subsequently becomes impossible to appropriately build the virtual network if, for example, a change in a configuration or setting of a network apparatus occurs.

SUMMARY OF THE INVENTION

In view of the circumstances described above, preferred embodiments of the present invention provide a relay server that is able to flexibly deal with a change in a status of a network and start a virtual network.

According to a first preferred embodiment of the present invention, a relay server includes a relay group information storage unit, a relay server information storage unit, a VPN group information storage unit, an address filter information storage unit, and a communication control unit. The relay group information storage unit stores relay group information concerning a relay group including another relay server that is mutually connectable with the relay server itself. The relay server information storage unit stores relay server information including relay server start-up information, client terminal start-up information, and client terminal registration information. The relay server start-up information concerns the relay server belonging to the relay group. The client terminal start-up information and the client terminal registration information concern a client terminal that is connected to the relay server belonging to the relay group. The VPN group information storage unit relates to a VPN group including routing apparatuses that are communication apparatuses set as routing points among communication apparatuses included in a relay communication system based on the relay group information and the relay server information. The VPN group is configured to perform communication in a virtual private network via the routing apparatuses. The VPN group information storage unit stores identification information of the routing apparatuses included in the VPN group and connection information indicating the routing apparatuses that are connected to one another to establish a routing session. The address filter information storage unit stores address filter information indicating a partner that the routing apparatus is able to designate as a packet destination, in association with identification information of the routing apparatus. The communication control unit is arranged and programmed to perform control to: cause information stored in the VPN group information storage unit to be shared among the routing apparatuses; when a virtual private network is started in the VPN group, transmit the address filter information to the other routing apparatuses and receive the address filter information from the other routing apparatuses, and update a content stored in the address filter information storage unit based on the address filter information, and establish a routing session to route a packet based on the connection information stored in the VPN group information storage unit; and, after the routing session is established, refer to a partner that the routing apparatus is able to designate as a destination based on the address filter information, and perform routing based on a content thus referred to.

This enables the relay server to establish a VPN with the routing apparatuses that are selected from the other communication apparatuses (other relay servers and client terminals) included in the relay communication system. Therefore, for example, a file can be shared only with a necessary communication apparatus. Additionally, when a VPN is started in the VPN group, the relay server obtains the address filter information from the other routing apparatuses. Accordingly, for example, even in a case where there is a routing apparatus in which the address filter information has been changed, a VPN capable of dealing with such a situation can be established.

In the relay server, it is preferable that the VPN group information storage unit stores, as the connection information, identification information of the routing apparatus that takes initiative to perform a communication control to establish a routing session and identification information of the routing apparatus that receives the communication control.

Accordingly, in a case of establishing a routing session between two routing apparatuses connected to each other in starting a VPN in the VPN group, the routing apparatus that should take initiative to perform the communication control can be defined in advance. This can prevent collision of the communication control.

Preferably, the relay server is configured as follows. In a case where a destination of a received packet is designated in the address filter information associated with identification information of the relay server itself, the relay server transmits the packet to the destination. In a case where a destination of a received packet is designated in the address filter information associated with identification information of the routing apparatus different from the relay server itself, the relay server transmits the packet to the routing apparatus via a routing session established between the relay server itself and the routing apparatus. In a case where a destination of a received packet is not designated in the address filter information associated with identification information of the routing apparatuses, the relay server does not transmit the packet.

This enables the relay server to appropriately perform routing based on the address filter information.

Preferably, the relay server is configured as follows. In a case where a state is switched from a first state in which a first communication apparatus that is the routing apparatus connected to a wide area communication network via another relay server defines a VPN group to a second state in which a second communication apparatus that is connected to the wide area communication network via the relay server itself defines a VPN group, and when the first communication apparatus in the first state and the second communication apparatus in the second state have the same identification information; in starting a virtual private network under the second state, the communication control unit is programmed to perform a control to establish a routing session between a connection partner of the first communication apparatus in the first state and the second communication apparatus via the relay server itself.

Accordingly, even in a case where the configuration of the VPN group is changed beyond the relay server, a VPN capable of flexibly dealing with such a situation can be established. Additionally, a VPN can be established in the second state by making effective use of the VPN group information in the first state.

In the relay server, it is preferable that the address filter information storage unit is configured to store a name of a partner that the routing apparatus is able to designate as a packet destination.

Accordingly, for example, when referring to the address filter information, the user can recognize an IP address or the like of a partner to which a packet can be transmitted, and simultaneously can recognize a name of the partner, too.

In the relay server, it is preferable that in a case where, after a virtual private network is started in the VPN group, the address filter information associated with identification information of the relay server itself is updated, the communication control unit performs a control to provide a notification of a content of the updating.

Accordingly, after a virtual private network is started in the VPN group, the relay server is able to provide a notification that the address filter information associated with the relay server itself is updated, to another routing apparatus or the like. This enables another routing apparatus to take appropriate measures in accordance with a change of the address filter information.

In the relay server, it is preferable that in a case where, after a virtual private network is started in the VPN group, a notification that the address filter information is updated is received, the communication control unit is programmed to perform, without stopping the virtual private network, control to: update a content stored in the address filter information storage unit based on the content of the updating; and refer to a partner that the routing apparatus is able to designate as a destination based on an updated version of the address filter information, and perform routing based on a content thus referred to.

Accordingly, the number of partners that the routing apparatus is able to designate as a packet destination can be increased or decreased while the VPN is maintained.

In the relay server, it is preferable that in a case where, after a virtual private network is started in the VPN group, it is detected that a certain routing apparatus does not function as an entity of the VPN group, the communication control unit is programmed to perform a control to stop a routing session established with the routing apparatus, without stopping the virtual private network.

Accordingly, in a case where it is detected that a certain routing apparatus does not function as an entity of the VPN group due to a connection failure, maintenance, or the like, the relay server can stop a routing session established with the certain routing apparatus, while maintaining the VPN. This makes it possible to establish a VPN capable of flexibly dealing with a change in a status.

Preferably, the relay server is configured as follows. The relay server information storage unit stores identification information of a second relay server that is a relay server different from the relay server itself, in association with identification information of a client terminal that is connected to a wide area communication network via the second relay server. In a case where it is detected that communication of the second relay server stops, the communication control unit determines whether or not there is a client terminal functioning as a routing point among client terminals connected to the wide area communication network via the second relay server, based on contents stored in the VPN group information storage unit and the relay server information storage unit. Then, in a case where there is any client terminal functioning as a routing point, the communication control unit is programmed to perform a control to stop a routing session established with the client terminal.

Accordingly, merely by detecting that communication of another relay server stops, the relay server is able to stop a routing session established with a client terminal that is connected to the another relay server and that functions as a routing point. This can eliminate the need for the client terminal to transmit a signal indicating that it does not function in the VPN group.

In the relay server, it is preferable that in a case where it is detected that a certain routing apparatus does not function as an entity of the VPN group, and when, as a result of the certain routing apparatus not functioning as a an entity of the VPN group, the number of routing apparatuses functioning as entities of the VPN group becomes one, the communication control unit is programmed to perform a control to stop the VPN group.

Accordingly, a VPN that substantially no longer functions as a network can be automatically stopped.

In another preferred embodiment of the present invention, a relay communication system includes a plurality of relay servers and client terminals. The client terminals are connectable with each other via the relay servers. The relay server includes a relay group information storage unit, a relay server information storage unit, a VPN group information storage unit, an address filter information storage unit, and a communication control unit. The relay group information storage unit stores relay group information concerning a relay group including another relay server that is mutually connectable with the relay server. The relay server information storage unit stores relay server information including relay server start-up information, client terminal start-up information, and client terminal registration information. The relay server start-up information concerns the relay server belonging to the relay group. The client terminal start-up information and the client terminal registration information concern the client terminal. The VPN group information storage unit relates to a VPN group including routing apparatuses that are set as routing points among the relay servers and the client terminals. The VPN group is configured to perform communication in a virtual private network via the routing apparatuses. The VPN group information storage unit stores identification information of the routing apparatuses that define the VPN group and connection information indicating the routing apparatuses that are connected to one another. The address filter information storage unit stores address filter information indicating a partner that the routing apparatus is able to designate as a packet destination, in association with identification information of the routing apparatus. The communication control unit is arranged and programmed to perform control to: cause information stored in the VPN group information storage unit to be shared among the routing apparatuses; when a virtual private network is started in the VPN group, transmit the address filter information to the other routing apparatuses and receive the address filter information from the other routing apparatuses, and update a content stored in the address filter information storage unit, and establish a routing session that enables a packet to be routed based on the connection information stored in the VPN group information; and, after the routing session is established, refer to a partner that the routing apparatus is able to designate as a destination based on the address filter information, and perform routing based on a content thus referred to.

Accordingly, a VPN can be established by using routing apparatuses selected from relay servers and client terminals. Therefore, for example, a file can be shared only with a necessary apparatus. Additionally, in this relay communication system, when a VPN is started in the VPN group, the routing apparatuses exchange the address filter information with each other. Accordingly, for example, even in a case where there is a routing apparatus in which the address filter information has been changed, a VPN capable of dealing with such a situation can be established.

In the relay communication system, in a case where, after a virtual private network is started in the VPN group, the address filter information associated with identification information of the relay server itself is updated, the communication control unit of the relay server is programmed to perform a control to provide a notification of a content of the updating.

Accordingly, after a virtual private network is started in the VPN group, each of the relay servers is able to give a notification that the address filter information associated with the relay server itself is updated, to another routing apparatus or the like. This enables another routing apparatus to take appropriate measures in accordance with a change of the address filter information.

In the relay communication system, it is preferable that in a case where, after a virtual private network is started in the VPN group, it is detected that a certain routing apparatus does not function as an entity of the VPN group, the communication control unit of the relay server is programmed to perform a control to stop a routing session established with the certain routing apparatus, without stopping the virtual private network.

Accordingly, in a case where it is detected that a certain routing apparatus does not function as an entity of the VPN group due to a connection failure, maintenance, or the like, each of the relay servers can stop a routing session established with the certain routing apparatus, while maintaining the VPN. This makes it possible to establish a VPN capable of flexibly dealing with a change in a status.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 3 is a diagram showing a content of relay group information.

FIG. 4 is a diagram showing a content of relay server information.

FIGS. 5A-5D are diagrams showing content of client terminal information.

FIG. 6 is a diagram showing a content of VPN group information.

FIGS. 7A and 7B are diagrams showing content stored in an address filter information storage unit.

FIGS. 15A and 15B are diagrams showing a content stored in the address filter information storage unit after being updated by address filter information that is made at a time of the remote login.

FIGS. 17A and 17B are diagrams showing content stored in the address filter information storage unit after address filter information associated with a relay server 3 is updated.

DETAILED DESCRIPTION OF THE PREFERRED EMBODIMENTS

Figure 1:
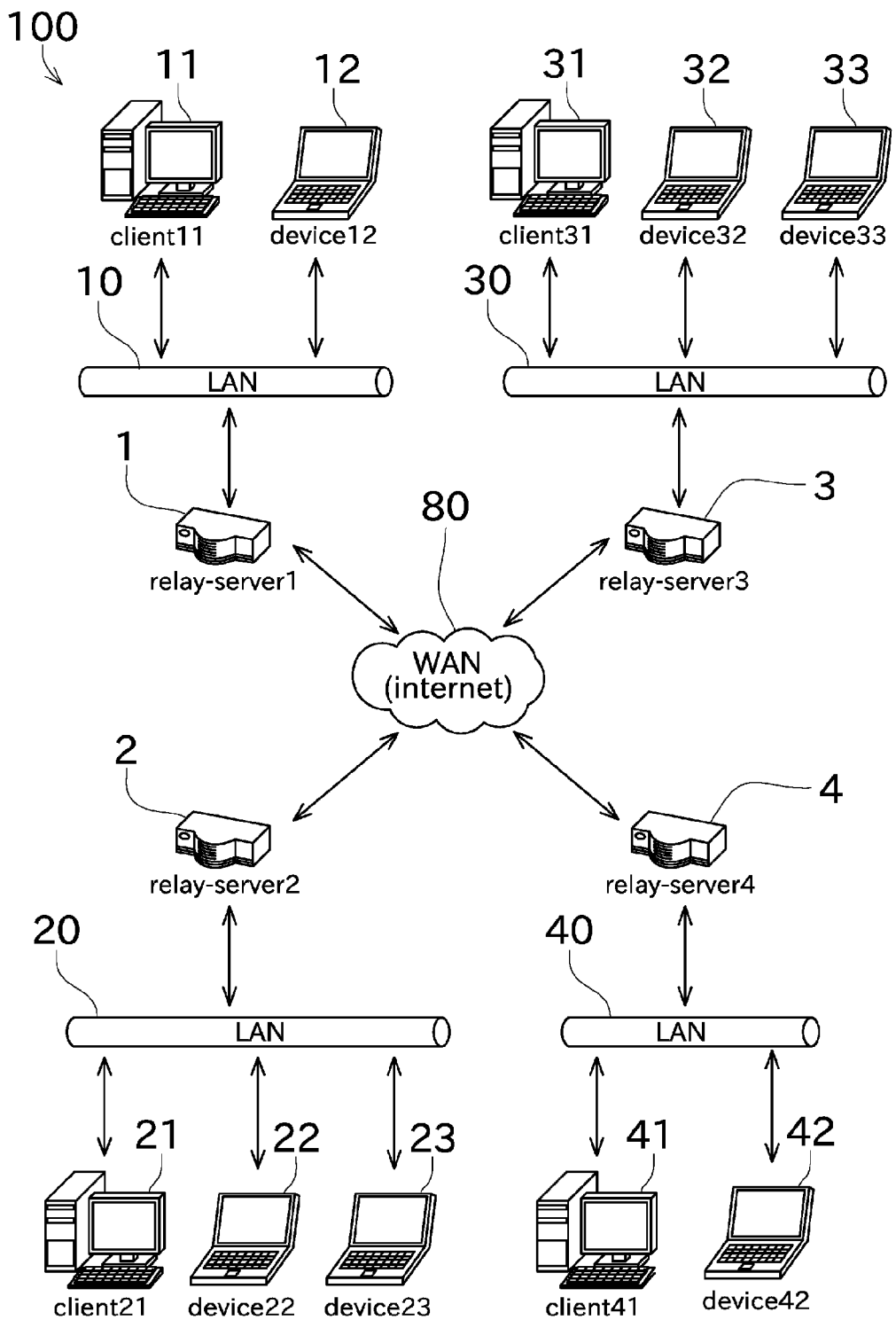
FIG. 1 is a diagram for explaining an overall configuration of a relay communication system according to a preferred embodiment of the present invention.

Next, preferred embodiments of the present invention will be described with reference to the drawings. Firstly, with reference to FIG. 1, an outline of a relay communication system 100 according to a preferred embodiment of the present invention will be described. FIG. 1 is an explanatory diagram showing an overall configuration of a relay communication system 100 according to one preferred embodiment of the present invention.

As shown in FIG. 1, the relay communication system 100 includes a plurality of LANs 10, 20, 30, and 40 that are connected to a Wide Area Network (WAN, wide area communication network) 80. Each of the LANs 10, 20, 30, and 40 preferably is a relatively small network located in a physically remote location. In this preferred embodiment, the internet preferably is used as the WAN 80, for example.

In the following, a specific description will be given of each LAN. As shown in FIG. 1, a relay server 1, a client terminal 11, and a processing apparatus 12 are connected to the LAN 10. A relay server 2, a client terminal 21, a processing apparatus 22, and a processing apparatus 23 are connected to the LAN 20. A relay server 3, a client terminal 31, a processing apparatus 32, and a processing apparatus 33 are connected to the LAN 30. A relay server 4, a client terminal 41, and a processing apparatus 42 are connected to the LAN 40.

Each of the relay servers 1, 2, 3, and 4 is connected not only to each of the LANs 10, 20, 30, and 40 but also to the WAN 80, and therefore able to communicate not only with the client terminal connected to the same LAN but also with the relay servers connected to the other LANs. Accordingly, not only a global IP address but also a private IP address is provided to each of the relay servers 1, 2, 3, and 4.

The client terminals 11, 21, 31, and 41 are, for example, configured as personal computers, which are able to communicate with one another via the relay servers 1, 2, 3, and 4. The processing apparatuses 12, 22, 23, 32, 33, and 42 preferably are, for example, configured as personal computers, which are able to transmit a packet to the client terminals 11, 21, 31, and 41 via the LANs 10, 20, 30, and 40.

Figure 2:
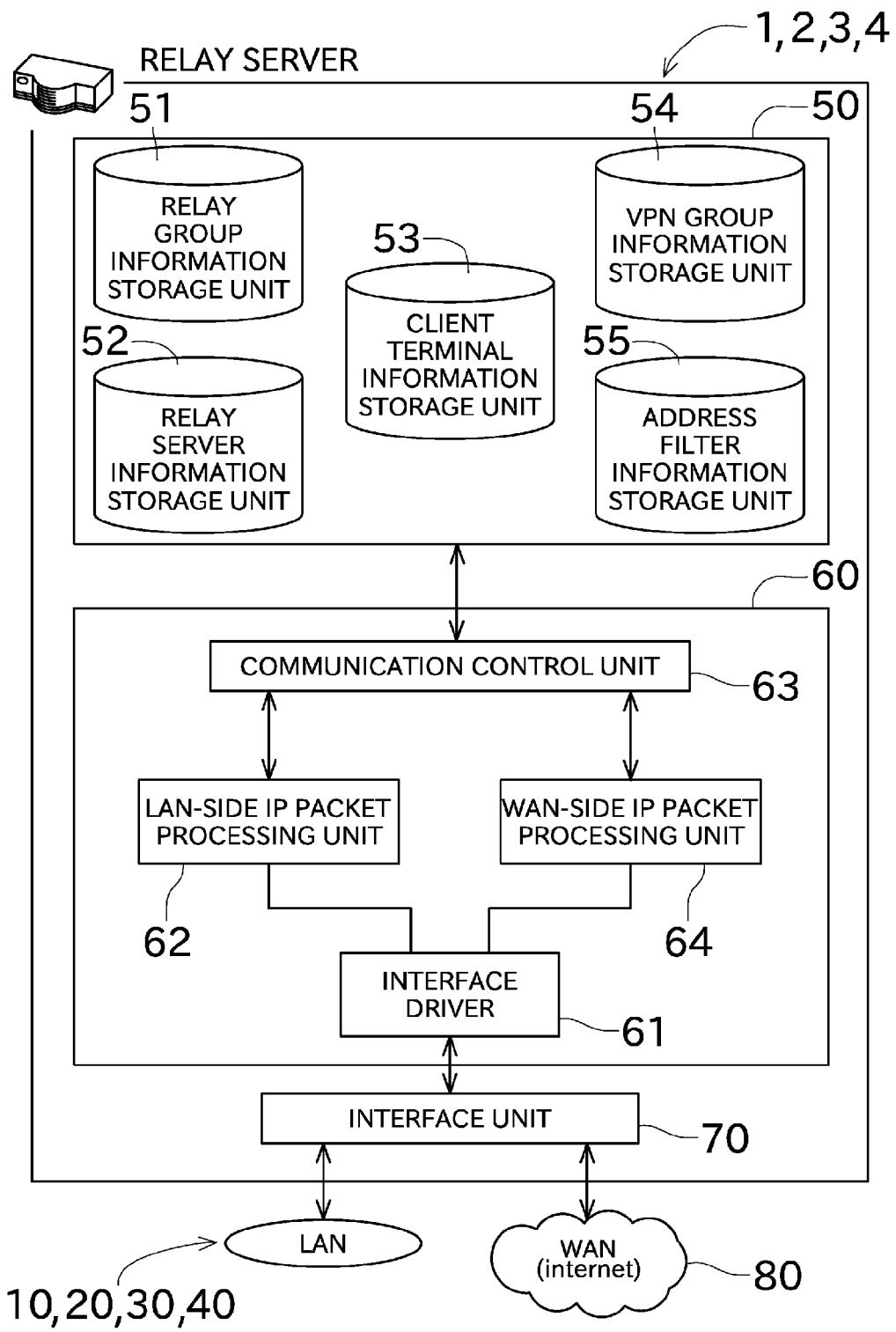
FIG. 2 is a function block diagram of a relay server.

Next, the relay servers 1, 2, 3, and 4 will be described. These four relay servers preferably have substantially the same configurations except for a portion of the data stored therein. Therefore, the relay server 1 will be described as a representative. Firstly, a configuration included in the relay server 1 will be described with reference to FIG. 2. FIG. 2 is a function block diagram of any of the relay servers 1, 2, 3, and 4.

As shown in FIG. 2, the relay server 1 includes a storage unit 50, a control unit 60, and an interface unit 70.

The interface unit 70 is able to communicate with a terminal within the LAN 10 by using the private IP address. The interface unit 70 is also capable of communication through the WAN 80 by using the global IP address.

The control unit 60 preferably is, for example, a CPU programmed to perform control and computation functions, and to execute various kinds of processing based on a program read out from the storage unit 50. The control unit 60 is programmed to control various communication processes in accordance with a protocol such as TCP/IP, UDP, or SIP, for example. As shown in FIG. 2, the control unit 60 includes an interface driver 61, a LAN-side IP packet processing unit 62, a communication control unit 63, and a WAN-side IP packet processing unit 64.

The interface driver 61 is driver software that controls the interface unit 70. The LAN-side IP packet processing unit 62 performs an appropriate process on a packet received from the LAN 10, and outputs a result to the communication control unit 63. The WAN-side IP packet processing unit 64 performs an appropriate process on a packet received from the WAN 80, and outputs a result to the communication control unit 63.

The communication control unit 63 is programmed to determine a destination of the received packet based on information indicated by the packet and information stored in the storage unit 50, and transmits the packet to the determined destination. The communication control unit 63 is programmed to update a content stored in the storage unit 50 based on information received from another terminal.

The storage unit 50 is, for example, configured as a hard disk or a non-volatile RAM, and able to store various types of data. The storage unit 50 includes a relay group information storage unit 51, a relay server information storage unit 52, a client terminal information storage unit 53, a VPN group information storage unit 54, and an address filter information storage unit 55. Hereinafter, a configuration included in the storage unit 50 will be described with reference to FIGS. 3 to 7B. FIG. 3 is a diagram showing a content of relay group information. FIG. 4 is a diagram showing a content of relay server information. FIGS. 5A-5D are diagrams showing content of client terminal information. FIG. 6 is a diagram showing a content of VPN group information. FIGS. 7A and 7B is a diagram showing content of address filter information.

The relay group information storage unit 51 stores relay group information indicating a relay group and a relay server included in the relay group.

As shown in FIG. 3, in the relay group information, a group tag and site tags that are child elements whose parent element is the group tag are described. In the group tag, group information 511 concerning a relay group is described. As the group information 511, identification information ("id") of the relay group, a last modification time ("lastmod"), and a name ("name") of the relay group, are described. In the site tags, group configuration information 512 concerning relay servers included in the relay group is described. In the group configuration information 512, identification information ("id") of these relay servers is described. An additional relay group can be established. In such a case, a new relay group is given unique identification information different from those of the other relay groups. This enables such setting that, for example, data exchange is performed only within a specific relay group.

As for this relay group information, the information is shared among the relay servers 1, 2, 3, and 4 included in this relay group. In a case where a certain relay server performs a process to change the relay group, it is transmitted to the other relay servers and the relay group information is updated. In this manner, the relay group information is dynamically shared.

The relay server information storage unit 52 stores relay server information indicating an outline of a relay server that performs relay communication and a client terminal that belongs to this relay server.

In the relay server information shown in FIG. 4, site tags each described for each relay server, and node tags that are child elements whose parent elements are the site tags, are described. In the site tag, server information 521 concerning the relay server 1 is described. As the server information 521, identification information ("id") of the relay server, a name ("name") of the relay server, and start-up information ("stat"), are described. The stat being "active" indicates that the relay server logs in to the relay communication system 100, and the stat being blank indicates that the relay server is logging off. In the node tag that is the child element of the site tag, belonging information 522 indicating a client terminal belonging to the relay server is described. As the belonging information 522, a name ("group") of the relay group to which a client terminal belongs, identification information ("id") of the client terminal, a name ("name") of the client terminal, and identification information ("site") of the relay server that is a login destination, are described. When the client terminal does not log in to the relay server (relay communication system 100), the "site" is blank.

Communication by the relay group is performed based on the above-described relay group information and relay server information, in the following manner. For example, in a case where a packet is transmitted from the client terminal 11 to the client terminal 21, the client terminal 11 firstly transmits a packet to the relay server 1 that is the relay server to which the client terminal 11 itself is connected. Here, a relay server capable of a packet exchange can be determined based on the above-described relay group information. Additionally, the identification information of a client terminal belonging to the relay server, and whether or not the client terminal is connected, can be determined based on the relay server information. Based on such information, the relay server 1 transmits the packet to the relay server 2 that is the relay server to which the client terminal 21 is connected. Then, the relay server 2 transmits the packet to the client terminal 21. As a result, relay communication can be performed between client terminals.

As for the relay server information as well as the relay group information, the information is shared among the relay servers 1, 2, 3, and 4 included in this relay group. In a case where a certain relay server performs a process to change the relay server information, it is transmitted to the other relay servers and the relay server information is updated. In this manner, the relay server information is dynamically shared.

The client terminal information storage unit 53 stores client terminal information that is detailed information concerning a client terminal. Each of the relay servers 1, 2, 3, and 4 stores the client terminal information concerning only the client terminal belonging to itself. For example, since the client terminal 11 belongs to the relay server 1 as shown in FIG. 1, the client terminal information storage unit 53 included in the relay server 1 stores only the client terminal information of the client terminal 11.

The client terminal information stored in the client terminal information storage unit 53 of the relay server 1 is shown in FIG. 5A. Likewise, the client terminal information stored in the relay server 2 is shown in FIG. 5B, the client terminal information stored in the relay server 3 is shown in FIG. 5C, and the client terminal information stored in the relay server 4 is shown in FIG. 5D.

In the client terminal information shown in FIGS. 5A-5D, a node tag is described. In the node tag, a private IP address ("addr") of a client terminal, a name ("group") of a relay group to which the client terminal belongs, identification information ("id"), a name ("name"), a passcode ("pass") for logging in to a relay server, and port information ("port"), are described.

The VPN group information storage unit 54 stores VPN group information that is information concerning a VPN group including relay servers that define a relay group and an apparatus (hereinafter referred to as a routing apparatus) selected from the client terminals. The VPN group is a group within the relay group. Establishing a routing session among routing apparatuses can establish a virtual network.

In the VPN group information shown in FIG. 6, a vnet tag is described. In the vnet tag, VPN group basic information 541, routing point information 542, and routing session information 543, are described. In the VPN group basic information 541, a name ("group") of a relay group to which a VPN group belongs, identification information ("id") of the VPN group, a last modification time ("lastmod"), and a name ("name") of the VPN group, are described. In the routing point information 542, identification information of routing apparatuses that perform routing at a time of performing communication among VPN groups is described. In an example shown in FIG. 6, the client terminal 11, the client terminal 21, and the relay server 3 are described as the routing apparatuses. In the routing session information 543, the routing apparatuses connected to one another in the VPN group are described. In the routing session information 543, the routing apparatuses are defined such that they are classified into the side ("sp (start point)") that takes initiative to perform a communication control and the side ("ep (endpoint)") that receives the communication control during a routing session establishment process for starting a VPN in the VPN group. In the following description, the routing apparatus in the side takes initiative to perform the communication control to establish the routing session may be sometimes referred to as "start point", and the routing apparatus in the side that receives such a communication control may be sometimes referred to as "endpoint".

As for the VPN group information as well as the relay server information and the relay group information, the information is shared among the relay servers 1, 2, and 3 included in the VPN group. In a case where a certain relay server performs a process to change the VPN group information, it is transmitted to the other relay servers of the VPN group, and the VPN group information is updated. In this manner, the VPN group information is dynamically shared. A process for establishing the VPN group will be described later.

The address filter information storage unit 55 stores address filter information indicating a partner to which a routing apparatus is able to transmit (transfer) a packet at a time when the routing apparatus starts a VPN and performs routing.

FIG. 7A shows a content of the address filter information associated with the routing apparatus. As shown in FIG. 7A, the client terminal 11 is able to transmit (transfer) the received packet to the processing apparatus 12. The client terminal 21 is able to transmit the received packet to the processing apparatus 22 and the processing apparatus 23. The relay server 3 is able to transmit the received packet to all of the apparatuses connected to the LAN 30.

As shown in FIG. 7B, the address filter information storage unit 55 stores identification information of a routing apparatus in association with an IP address and a name of a partner that can be designated as a destination of the packet by the routing apparatus. Any name, such as a name that is easily recognizable by a user, can be set as the name of the partner that can be designated as the destination of the packet. For example, the name can be set in consideration of a place where the apparatus and the LAN are arranged. Each of the routing apparatus is configured to display the address filter information on a display or the like. The address filter information is exchanged between the routing apparatuses at a time of starting the VPN.

The relay servers 1, 2, 3, and 4 are configured as described above. The client terminals 11, 21, 31, and 41 include storage units 50 and control units 60 preferably having substantially the same configurations as those of the relay servers 1, 2, 3, and 4, though a detailed description of the configurations of the client terminals 11, 21, 31, and 41 is omitted.

Next, a description will be given of a process for establishing the VPN group and performing routing of a packet in the established VPN group.

Figure 8:
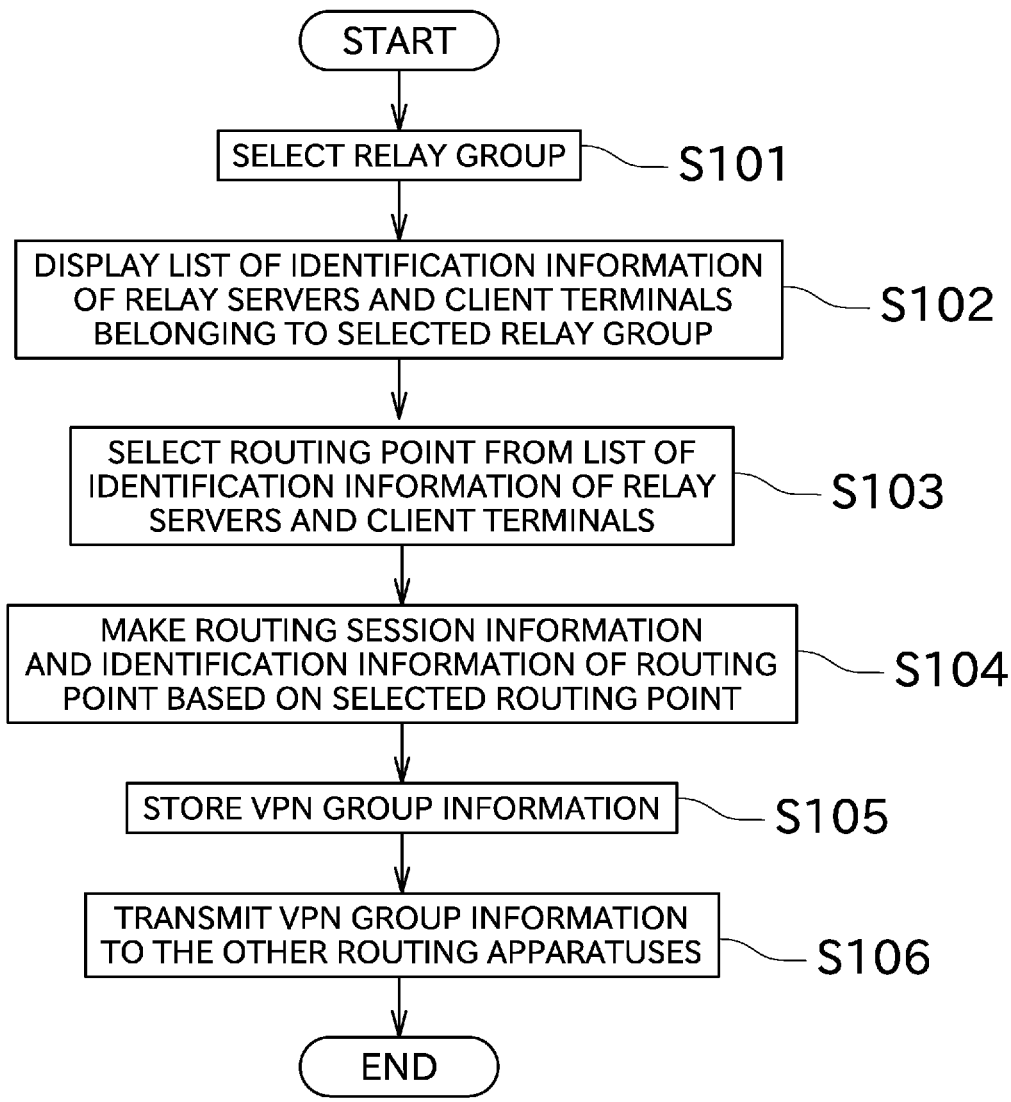
FIG. 8 is a flowchart showing a process for making a VPN group.
Figure 11:
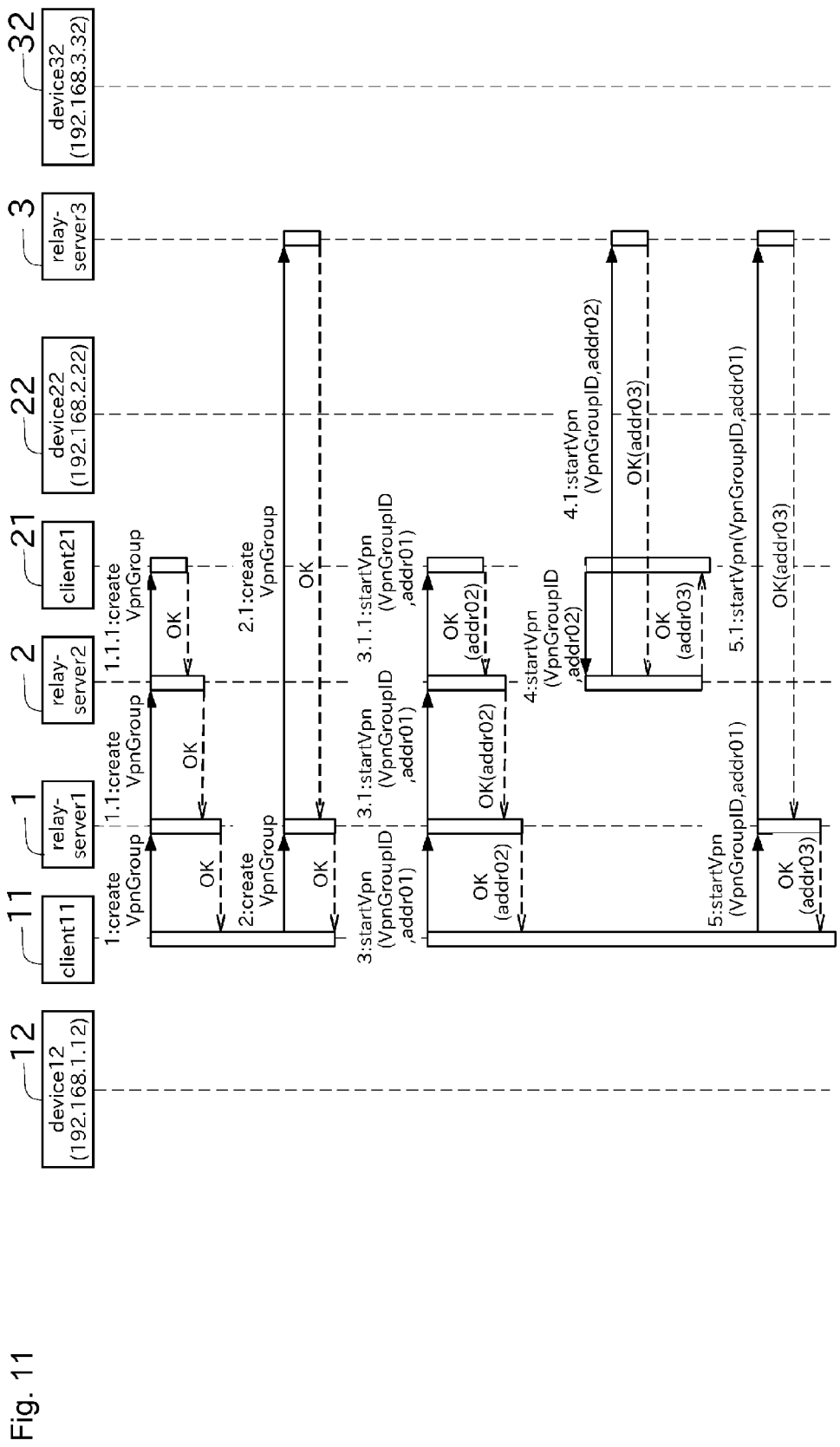
FIG. 11 is a sequence diagram showing a communication process for making the VPN group and a communication process for updating address filter information.

Firstly, a flow of establishing the VPN group will be described with reference to FIGS. 8 and 11. FIG. 8 is a flowchart showing a process for establishing the VPN group. FIG. 11 is a sequence diagram showing a communication process for establishing the VPN group and a communication process for updating the address filter information.

A user using the relay communication system 100 operates the client terminals 11, 21, 31, and the like, and thus can display a VPN group setting screen. Here, a case will be described where setting is performed using the client terminal 11. In the setting screen displayed on the client terminal 11, a plurality of relay groups to which this client terminal 11 belongs are displayed. The user selects, from the plurality of relay groups, a relay group in which he/she desires to establish a VPN group (S101).

After a relay group is selected, a list of identification information of relay servers and client terminals that belong to the selected relay group and are able to function as routing points, is displayed in a screen of the client terminal 11 (S102). Then, the user selects the identification information of the relay server and the client terminal that are to function as the routing points in the VPN group to be established (S103). In the case described herein, it is assumed that the identification information of the client terminal 11, the client terminal 21, and the relay server 3 is selected by the user.

Then, the routing session information is established based on the selected routing points (S104). The identification information of the routing points is also established based on the identification information of the selected relay server and the like (S104). Identification information of the VPN group, and the like, are added to these information, and thus the VPN group information shown in FIG. 6 is established. The VPN group information storage unit 54 stores this VPN group information (S105).

Then, the client terminal 11 transmits the VPN group information thus established to the other routing apparatuses (the client terminal 21 and the relay server 3) (S106), and thus provides a notification that the VPN group is established. Here, as shown in FIG. 11, transmission of the VPN group information to the client terminal 21 is performed via the relay server 1 and the relay server 2 (Sequence Number 1: createVpnGroup). Transmission of the VPN group information to the relay server 3 is performed via the relay server 1 (Sequence Number 2: createVpnGroup).

As a result, the process for establishing the VPN group is completed. As shown in the above, in this preferred embodiment, communication between apparatuses may be sometimes performed via the relay servers 1, 2, 3, 4. In this respect, in the following description, a specific description of a communication process performed via the relay servers 1, 2, 3, 4 is omitted, and it may be expressed as "the client terminal 11 performs transmission to the client terminal 21", for example.

Figure 9:
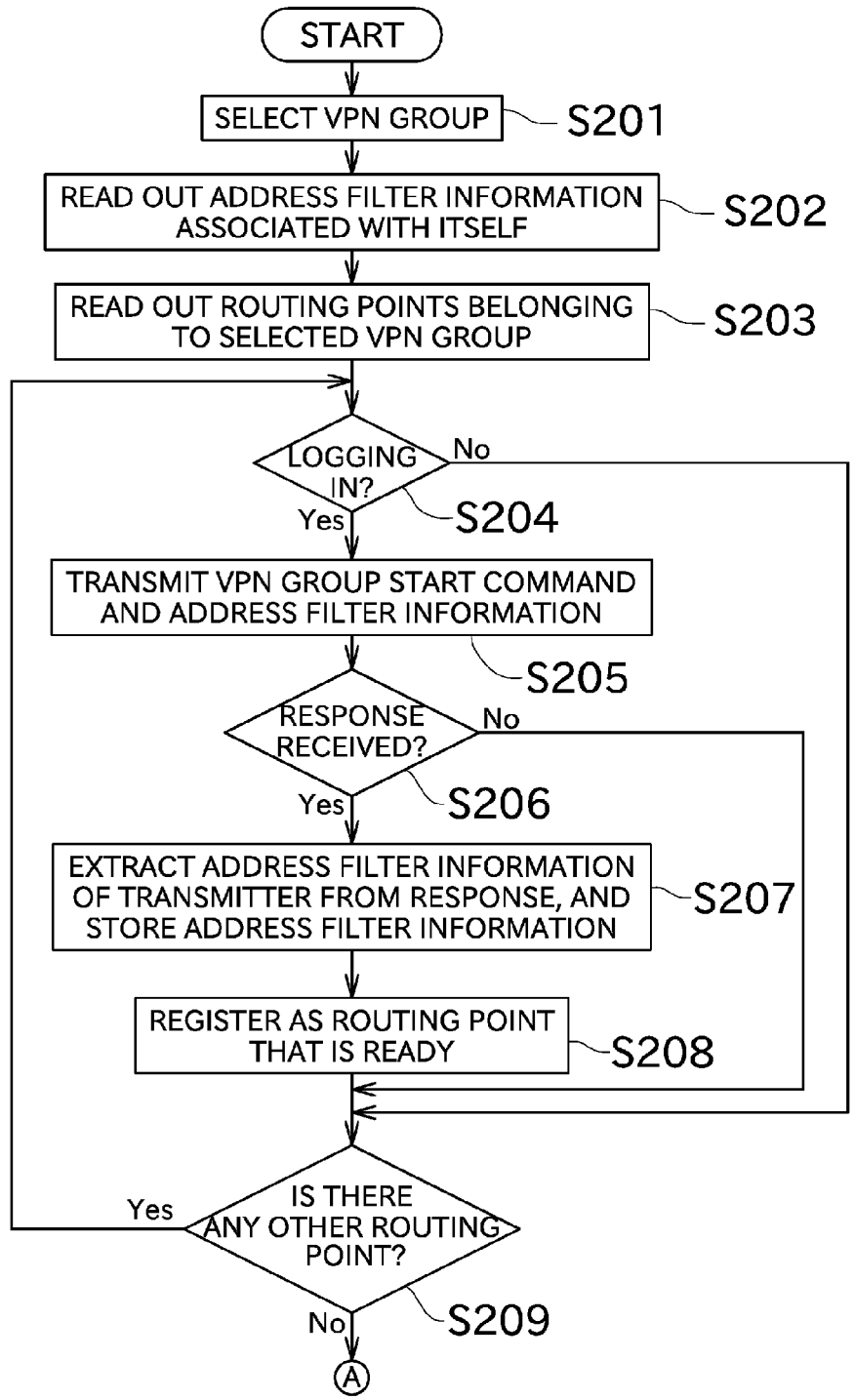
FIG. 9 is a flowchart showing the former half of a VPN start process.
Figure 10:
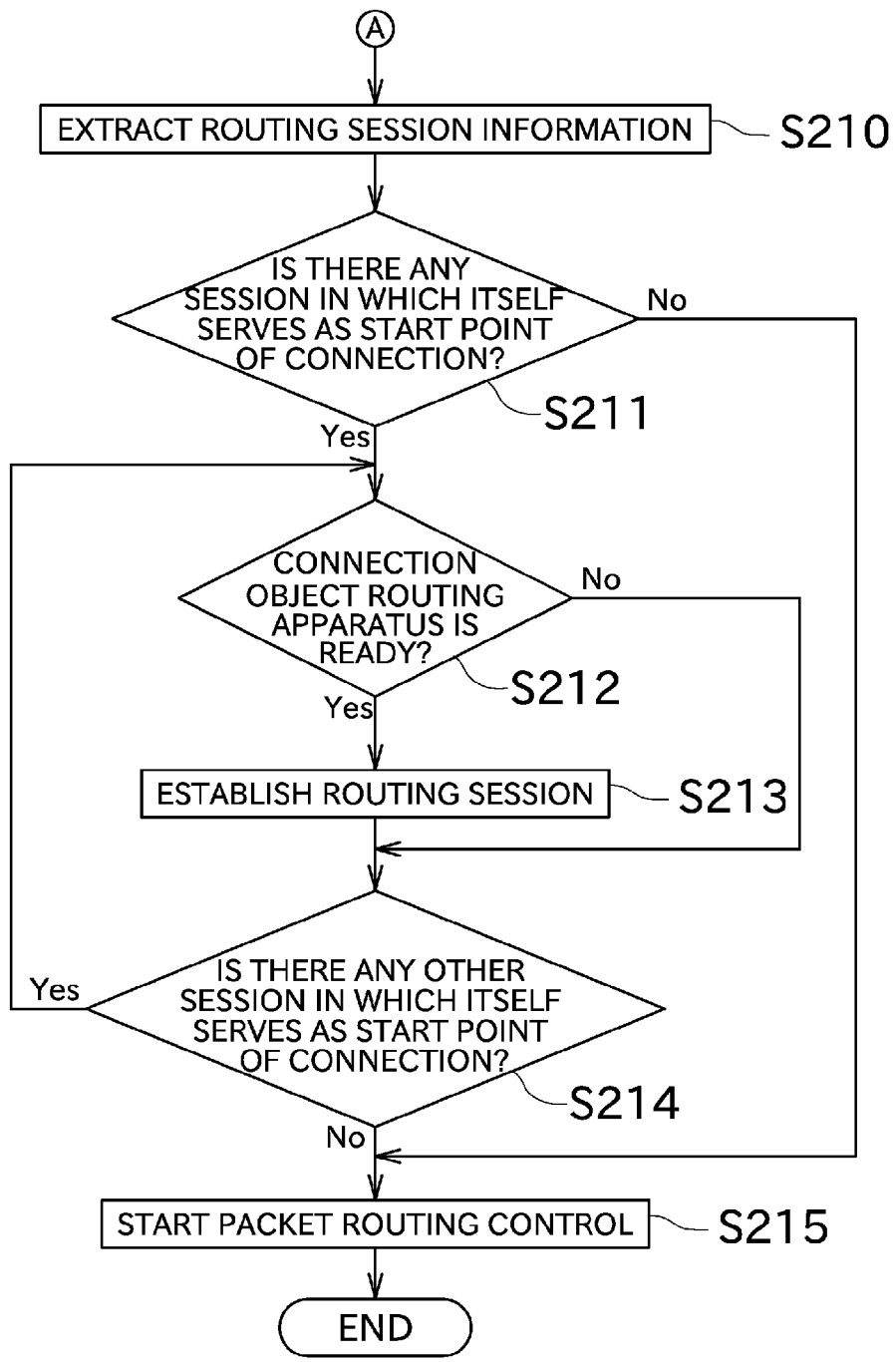
FIG. 10 is a flowchart showing the latter half of the VPN start process.
Figure 12:
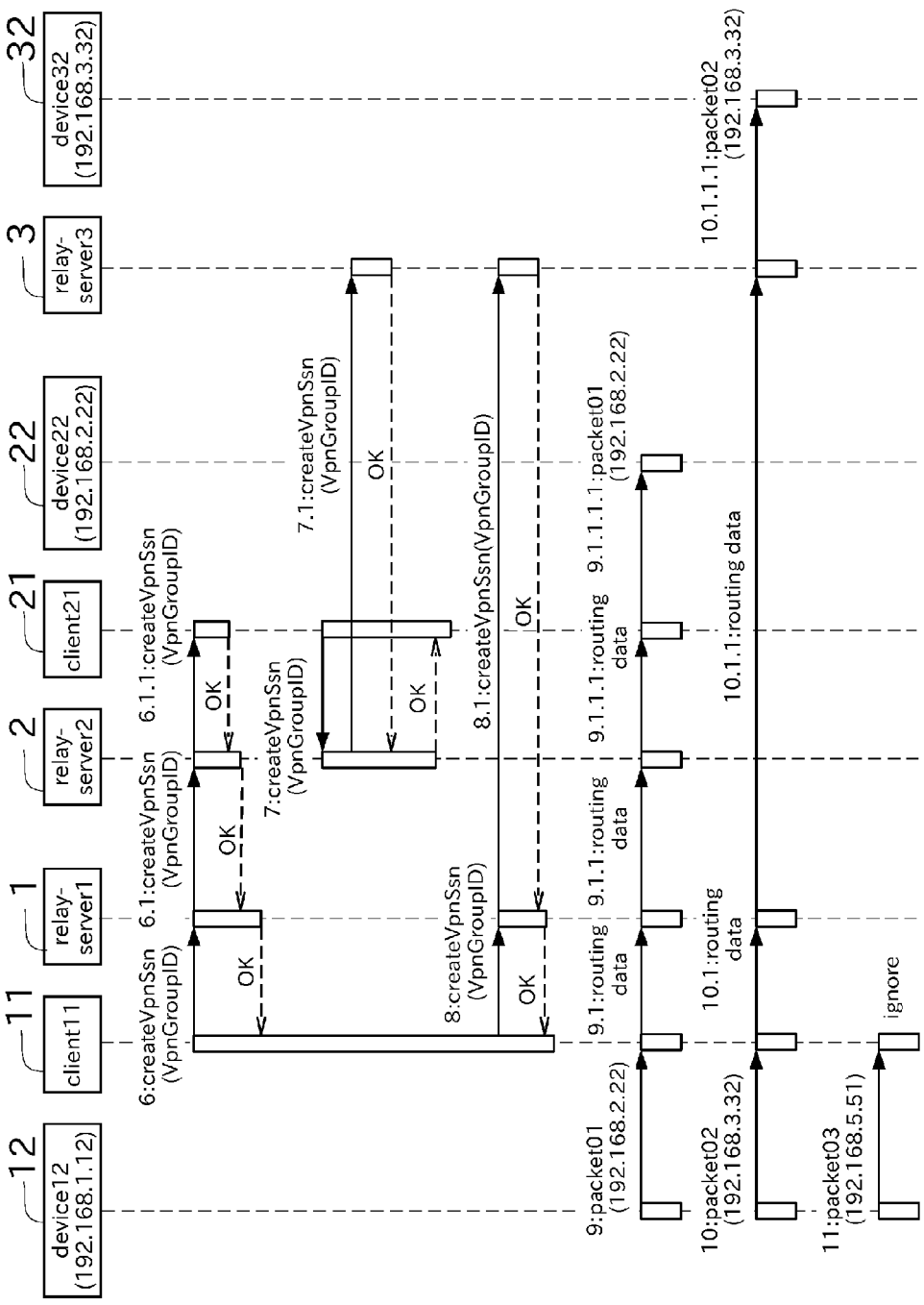
FIG. 12 is a sequence diagram showing a communication process for establishing a routing session and a communication process for transmitting a packet.

Next, a flow of starting a VPN in the established VPN group will be described with reference to FIGS. 9 to 12. FIG. 9 is a flowchart showing the former half of a VPN start process. FIG. 10 is a flowchart showing the latter half of the VPN start process. FIG. 12 is a sequence diagram showing a communication process for establishing a routing session and a communication process for transmitting a packet.

By operating the client terminals 11, 21, or the like, the user is able to display the established VPN groups on the screen. Then, by selecting an appropriate VPN group from the displayed VPN groups (S201), the user is able to cause the VPN start process to be performed. In the description given herein, it is assumed that the user operates the client terminal 11 and selects the VPN group formed in the above-described manner (the VPN group in which the client terminal 11, the client terminal 21, and the relay server 3 are routing apparatuses).

The client terminal 11 firstly reads out the address filter information associated with the client terminal 11 itself (S202). In the address filter information associated with the identification information of the client terminal 11, as shown in FIGS. 7A and 7B, it is described that packet can be transmitted to the processing apparatus 12. Then, the client terminal 11 reads out the routing points that belong to the selected VPN group (S203). As a result, based on the content of the VPN group information shown in FIG. 6, the identification information of the client terminal 21 and the relay server 3 is read out.

Based on the relay server information, the client terminal 11 firstly determines whether or not the client terminal 21 is currently logging in (whether the identification information of the relay server is described in "site", or the "site" is blank) (S204). The relay server information shown in FIG. 4 indicates that the client terminal 21 is currently logging in. Therefore, the client terminal 11 transmits a VPN-group start command to the client terminal 21 (Sequence Number 3: startVpn in FIG. 11). At this time, simultaneously, the client terminal 11 also transmits the identification information (VpnGroupID) of the selected VPN group and the address filter information (addr01) associated with the identification information of the client terminal 11 to the client terminal 21.

This enables the client terminal 21 to identify the VPN group for which a start process should be performed and to obtain the latest address filter associated with the identification information of the client terminal 11. The client terminal 21 notifies the client terminal 11 that the client terminal 21 has received the signal, and transmits the address filter information (addr02) associated with the client terminal 21 itself to the client terminal 11.

Upon reception of a response of the client terminal 21 (S206), the client terminal 11 stores the received address filter information into the address filter information storage unit 55 (S207). Also, the client terminal 11 registers the client terminal 21 as a routing point that has been ready for starting the VPN (S208).

Then, the client terminal 11 determines whether or not there is any other routing point (S209). At a time point when the VPN start process with respect to the client terminal 21 has been completed, a VPN start process with respect to the relay server 3 is not yet performed. Therefore, the client terminal 11 then performs the processing of S204 to S208 with respect to the relay server 3. As a result, the client terminal 11 transmits the VPN start command and the address filter information to the relay server 3 (Sequence Number 5: startVpn in FIG. 11). Then, similarly to the case of the client terminal 21, the client terminal 11 receives the address filter information from the relay server 3, and stores it.

These transmission and reception of the VPN-group start command and the address filter information are also performed between the client terminal 21 and the relay server 3 (Sequence Number 4, startVpn). In this manner, the client terminal 11, the client terminal 21, and the relay server 3 can obtain the address filter information of the other routing points.

Thus, in starting a VPN, each of the routing apparatuses is able to exchange (obtain) the address filter information with the other routing apparatuses, and establish the VPN by using the latest address filter information. Accordingly, even in a case where the address filter information of a portion of the routing apparatuses has been changed before the VPN is started, the VPN can be started under a state where such a change is reflected in all the routing apparatuses. This can prevent inconsistency in the routing of a packet, and can improve the reliability.

Then, the client terminal 11 extracts the routing session information stored in the VPN group information storage unit 54 (S210), and determines whether or not a routing session in which the client terminal 11 itself serves as a start point is described therein (S211). In the routing session information shown in FIG. 6, it is described that the client terminal 11 serves as a start point in a routing session established with the client terminal 21 and the relay server 3.

Accordingly, the client terminal 11 firstly selects the client terminal 21, and determines whether or not the client terminal 21 is a routing point that has been ready for starting the VPN (S212). Since the client terminal 21 has been ready because of S208 mentioned above, the client terminal 11 performs a communication control on the client terminal 21, for establishing a routing session (S213; Sequence Number 6: createVpnSsn).

Then, the client terminal 11 determines whether or not any other routing session in which the client terminal 11 itself serves as a start point of connection is described (S214). At a time point when the routing session establishment process with respect to the client terminal 21 has been completed, the routing session establishment process with respect to the relay server 3 is not yet performed. Therefore, the client terminal 11 performs, on the relay server 3, the same communication as the communication performed on the client terminal 21 (Sequence Number 8: createVpnSsn). As a result, a routing session is established between the client terminal 11 and the relay server 3.

As shown in FIG. 6, in the routing session information, it is described that the client terminal 21 should be a start point of a routing session with the relay server 3. Accordingly, the communication control to establish the routing session is also performed from the client terminal 21 toward the relay server 3 (Sequence Number 7: createVpnSsn). As a result of the above, routing sessions can be established between the client terminal 11 and the client terminal 21, between the client terminal 11 and the relay server 3, and between the client terminal 21 and the relay server 3. Then, a packet routing control is started (S215). Each of the routing apparatuses does not perform an initial communication control for establishing a routing session unless it is described in the routing session information that itself should be a start point. This can prevent collision of the communication control, and can establish a routing session between apparatuses via a simple control.

Next, a process for routing a packet by using the established routing session will be described with reference to FIGS. 7A, 7B and 12. In the following, a description will be given of a process that the client terminal 11 performs when the client terminal 11 functioning as the routing point receives three kinds of packets, namely, a first packet to a third packet, from the processing apparatus 12.

Firstly, a case will be described where a first packet whose destination has an IP address of (192.168.2.22) is received (Sequence Number 9: packet01). The client terminal 11, after receiving this first packet, compares the IP address of the destination against the address filter information shown in FIGS. 7A and 7B. Then, the client terminal 11 detects a routing point that is able to transmit a packet to the destination indicated in the first packet.

As shown in FIGS. 7A and 7B, the IP address of the destination of the first packet is included in the address filter information associated with the identification information of the client terminal 21. In this case, the client terminal 11 transmits the first packet to the client terminal 21 via the routing session established with the client terminal 21.

The client terminal 21 having received the first packet compares the IP address of the destination against the address filter information in the same manner as the client terminal 11 does. Then, the client terminal 21 detects that the client terminal 21 itself is described as a routing point that is able to transmit a packet to the destination of the first packet. In this case, the client terminal 21 transmits the first packet to the processing apparatus 22 that is the destination.

Next, a case will be described where a second packet whose destination has an IP address of (192.168.3.32) is received by the client terminal 11 (Sequence Number 10: packet02). In the address filter information shown in FIGS. 7A and 7B, the relay server 3 is designated as a routing point that is able to transmit a packet to the destination indicated in the second packet. Accordingly, the client terminal 11 transmits the second packet to the relay server 3 via the routing session established with the relay server 3. The relay server 3 detects that the relay server 3 itself is described as a routing point that is able to transmit a packet to the destination indicated in the second packet, and transmits the second packet to the processing apparatus 32 that is the destination.

Next, a case will be described where a third packet whose destination has an IP address of (192.168.5.51) is received by the client terminal 11 (Sequence Number 11: packet03). The client terminal 11 compares the IP address of the destination against the address filter information, and consequently detects that no routing point that is able to transmit a packet to the destination is described. In this case, the client terminal 11 does not transmit the received third packet to anywhere.

Thus, in this preferred embodiment, routing object data is fed through a routing session at an application layer. Therefore, the above-described routing is different from an ordinary IP routing.

In this manner, routing at the application layer allows LANs in distant places to communicate with each other by using the private IP addresses without regard to a WAN. Additionally, as described above, the address filter information storage unit 55 can display the name of a partner that can be designated as the destination of a packet. This enables the user to easily recognize an apparatus to which the packet can be transmitted by using the VPN.

Next, a communication process performed when the client terminal (first communication apparatus) 21 having logged into the relay communication system 100 via the relay server 2 logs out and then login is made from the client terminal (second communication apparatus) 41 via the relay server 4 by using the same identification information will be described with reference to FIGS. 13 and 14. Since the client terminal 21 and the client terminal 41 are connected to different LANs, in the following description, login is made from the client terminal 21 and login from the client terminal 41 may be called "normal login" and "remote login", respectively.

Figure 13:
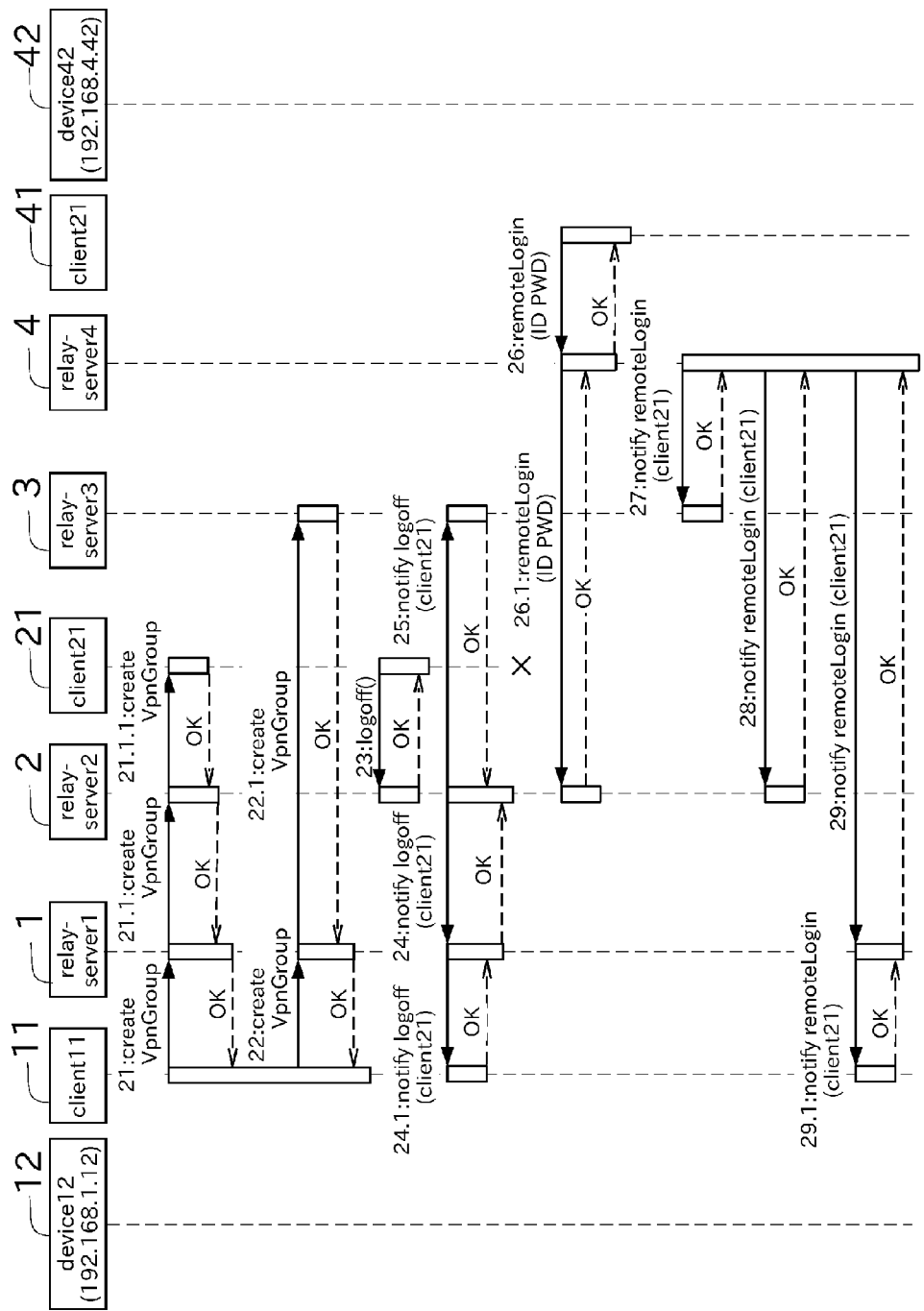
FIG. 13 is a sequence diagram showing a communication process performed when a remote login is made.
Figure 14:
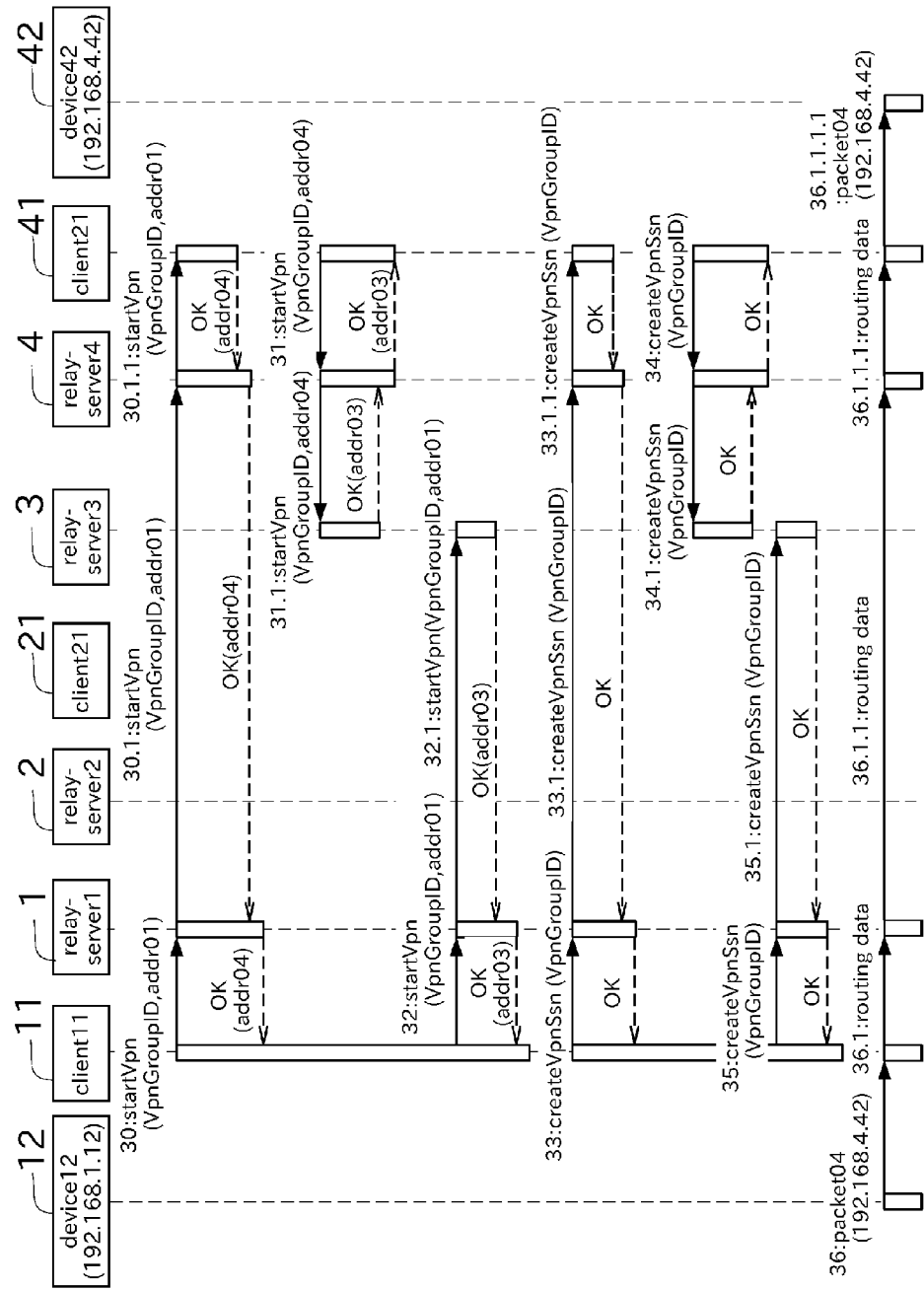
FIG. 14 is a sequence diagram showing a communication process performed when a packet is transmitted via a client terminal that is currently making a remote login.

FIG. 13 is a sequence diagram showing a communication process performed when remote login is made. FIG. 14 is a sequence diagram showing a communication process performed when a packet is transmitted via the client terminal 41 that is making the remote login. In a process which will be described below, processing equivalent to the above-described processing (the processing shown in FIGS. 11 and 12) is not described, or may be described in a simplified manner.

The following case is assumed. Firstly, under a state where the normal login is made from the client terminal 21, the user operates the client terminal 11 and instructs to establish a VPN group. Then, the client terminal 11, the client terminal 21, and the relay server 3 are selected as routing points of this VPN group. In this case, similarly to the case shown in FIG. 11, the client terminal 11 transmits, to the client terminal 21 and the relay server 3, the VPN group information concerning the VPN group created by the user so as to give a notification that the VPN group is established (Sequence Numbers 21, 22: createVpnGroup in FIG. 13).

It is assumed that, after the notification that the established VPN group is given, the client terminal 21 having made the normal login logs off from the relay server 2 (Sequence Number 23). In this case, the relay server 2 provides a notification that the client terminal 21 logs off, to the other communication apparatuses (the relay server 1, the client terminal 11, and the relay server 3) that define the relay group (Sequence Numbers 24, 25: notify logoff). The communication apparatuses having received this notification perform a process for deleting login information ("site") of the client terminal 21 which is stored in the relay server information storage unit 52. As a result, the identification information "relay-server-2@abc.net" of the relay server 2, which is described in "site", is cleared. Therefore, "site" becomes blank.

Here, a case is assumed where the client terminal 41 connected to the LAN 40 logs in to the relay communication system 100 by using the identification information (CLIENT-21@relayserver2.abc.net) that has been set to the client terminal 21 (Sequence Number 26: remoteLogin). A passcode corresponding to this identification information is stored only in the client terminal information storage unit 53 of the relay server 2. Therefore, the relay server 4 transmits the inputted identification information (ID) and passcode (PWD) to the relay server 2 (Sequence Number 26.1: remoteLogin). When the relay server 2 authenticates the identification information and the corresponding passcode, it means that the remote login has been successfully made.

In a case where the remote login has been successfully made, the relay server 4 provides a notification that the client terminal 41 has logged in to the relay communication system 100 by using the identification information that has been set to the client terminal 21, to the other communication apparatuses (the relay server 3, the relay server 2, the relay server 1, and the client terminal 11) (Sequence Numbers 27, 28, 29: notify remoteLogin). The communication apparatuses having received this notification perform a process for writing the identification information "relay-server-4@abc.net" of the relay server 4 into the information (the content of "site" that is currently blank) that is contained in the belonging information 522 stored in the relay server information storage unit 52 and that indicates the login destination relay server corresponding to this identification information.

After the remote login is made, the user sets the address filter information in the client terminal 41. It is assumed that such setting is made that allows the client terminal 41 to transmit a packet to the processing apparatus 42, as shown in FIGS. 15A and 15B. The identification information used for the client terminal 41 to perform the remote login is the same as the identification information used for the client terminal 21 to perform the normal login. Accordingly, the identification information ("client-21@relay-server2.abc.net") that has been set to the client terminal 21 is described as the identification information of the routing apparatus which is included in the content (the content shown in FIGS. 15A and 15B) stored in the address filter information storage unit.

Next, a flow of starting the VPN after the above-described remote login is made will be briefly described. When the user instructs the client terminal 11 to start the VPN, the client terminal 11 transmits the address filter information associated with the client terminal 11 itself and the VPN-group start command to the client terminal 41 (Sequence Number 30: startVpn). The client terminal 41 having received this notification sends back to the client terminal 11, the address filter information associated with the client terminal 41 itself together with an acknowledgement of the start command. The above-described processing is also performed between the client terminal 11 and the relay server 3 (Sequence Number 32: startVpn).

The client terminal 41 also transmits the address filter information associated with the client terminal 41 itself and the VPN-group start command to the relay server 3 (Sequence Number 31: startVpn). The relay server 3 having received this notification sends back to the client terminal 41, the address filter information associated with the relay server 3 itself together with an acknowledgement of the start command.

In this manner, the client terminal 11 and the relay server 3 perform, on the client terminal 41, the same process as the process performed on the client terminal 21 in the case shown in FIGS. 11 and 12. On the other hand, the client terminal 41 performs, via the relay server 4, the same process as the process performed via the relay server 2 in the case shown in FIGS. 11 and 12. As a result, the client terminal 11 and the relay server 3 are able to obtain the address filter information newly set to the client terminal 41.

In the same manner as when the VPN is started in the normal login, a routing session is established (Sequence Numbers 33, 34, 35: createVpnSsn). In establishing a routing session between the client terminal 41 having performed the remote login and each of the routing points (the client terminal 11 and the relay server 3) that have been connection partners of the client terminal 21 during the normal login, communication between the apparatuses is performed via the relay server 4 of the LAN 40 to which the client terminal 41 having performed the remote login is connected (Sequence Numbers 33, 34). Then, a packet routing control for the VPN is started.

Here, a case will be described where, in the VPN established in this manner, the client terminal 11 receives a fourth packet whose destination has an IP address of (192.168.4.42) from the processing apparatus 12 (Sequence Number 36: packet04). In this case, as shown in FIGS. 15A and 15B, the client terminal 41 (the identification information that has been set to the client terminal 21) is designated as a routing point that is able to transmit a packet to the destination indicated in the fourth packet. Accordingly, the client terminal 11 transmits the fourth packet to the client terminal 41 via the routing session established with the client terminal 41. Then, the client terminal 41 detects that the client terminal 41 itself is described as a routing point that is able to transmit a packet to the destination indicated in the fourth packet, and transmits the fourth packet to the processing apparatus 42 that is the destination.

As thus far described, in this preferred embodiment, even when the remote login is perform, a new VPN can be easily established by making effective use of the VPN group information that has been established at a time of the normal login.

Figure 16:
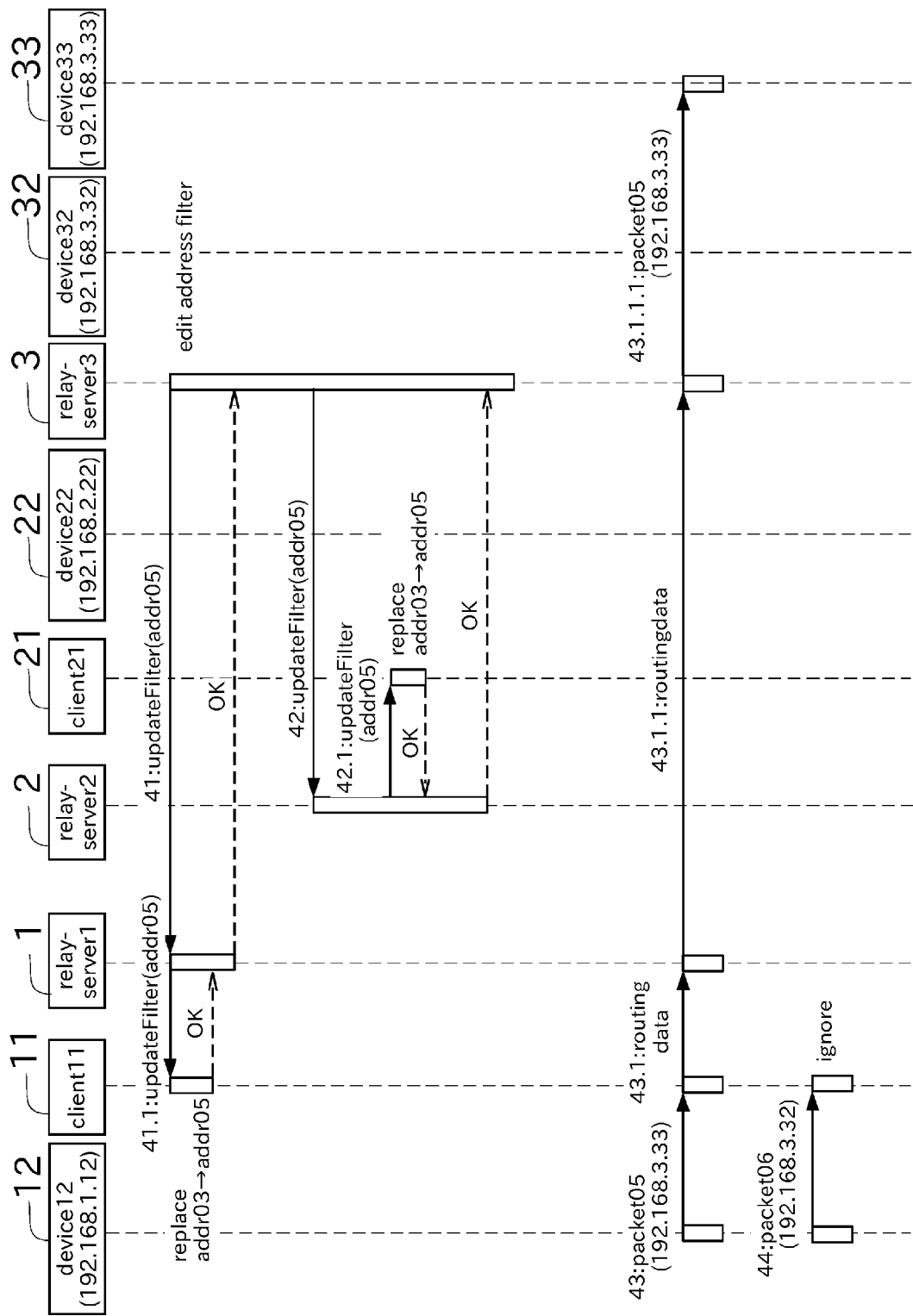
FIG. 16 is a sequence diagram showing a communication process performed when the address filter information is changed after the VPN is started.

Next, with reference to FIGS. 16, 17A and 17B, a case will be described where, under a state where the VPN is started in the VPN group in which the client terminal 11, the client terminal 21, and the relay server 3 serve as the routing points, the address filter information associated with the relay server 3 is changed after the VPN is started. FIG. 16 is a sequence diagram showing a communication process performed when the address filter information is changed after the VPN is started. FIGS. 17A and 17B are diagrams showing content stored in the address filter information storage unit after the address filter information associated with the relay server 3 is updated.

The user operates, for example, the client terminal 31 connected to the relay server 3, and thus can change the address filter information associated with the relay server 3. In the following, a description will be given of a communication process performed when a partner that the relay server 3 can designate as a packet destination is changed from "all of the apparatuses connected to the LAN 30" into "the processing apparatus 33", as shown in FIGS. 17A and 17B.

In a case where the address filter information associated with the relay server 3 is changed, the relay server 3 provides a notification thereof to the client terminal 11 (Sequence Number 41: updateFilter). This notification of change of the address filter information (and a notification indicated by Sequence Number 42 which will be described later) is performed through a route different from the routing session. In FIG. 16, the address filter information associated with the relay server 3 before being changed is indicated by "addr03", and the address filter information associated with the relay server 3 after being changed is indicated by "addr05". The client terminal 11 receives the notification of the change of the address filter information, and then updates the address filter information associated with the relay server 3 into the changed version.

The relay server 3 also provides the notification that the address filter information associated with the relay server 3 itself is changed to the client terminal 21, too (Sequence Number 42: updateFilter). The client terminal 21 as well as the client terminal 11 updates the address filter information associated with the relay server 3 into the changed version.

Here, a control by which the client terminal 11 and the client terminal 21 update the address filter information is performed without stopping the VPN.

Here, a case will be described where, under this state, the client terminal 11 receives a fifth packet whose destination has an IP address of (192.168.3.33) from the processing apparatus 12 (Sequence Number 43: packet05). This routing control is also performed without stopping the VPN. The destination indicated in the fifth packet is the processing apparatus 33. The relay server 3 is designated as a routing point that is able to transmit a packet to the processing apparatus 33. Accordingly, in the same manner as the above-described routing, the fifth packet is transmitted from the client terminal 11 to the relay server 3. Then, the relay server 3 detects that the relay server 3 itself is described as a routing point that is able to transmit a packet to the destination indicated in the fifth packet, and transmits the fifth packet to the processing apparatus 33 that is the destination.

Next, a case will be described where the client terminal 11 receives a sixth packet whose destination has an IP address of (192.168.3.32) from the processing apparatus 12 (Sequence Number 44: packet06). In this case, the client terminal 11 compares the IP address of the destination against the address filter information, and consequently detects that no routing point that is able to transmit a packet to the destination is described. In this case, the client terminal 11 does not transmit the received sixth packet to anywhere.

As described above, since the address filter information is notified and updated, the change of the address filter information and routing based on the changed address filter information can be performed without stopping the VPN.

Figure 18:
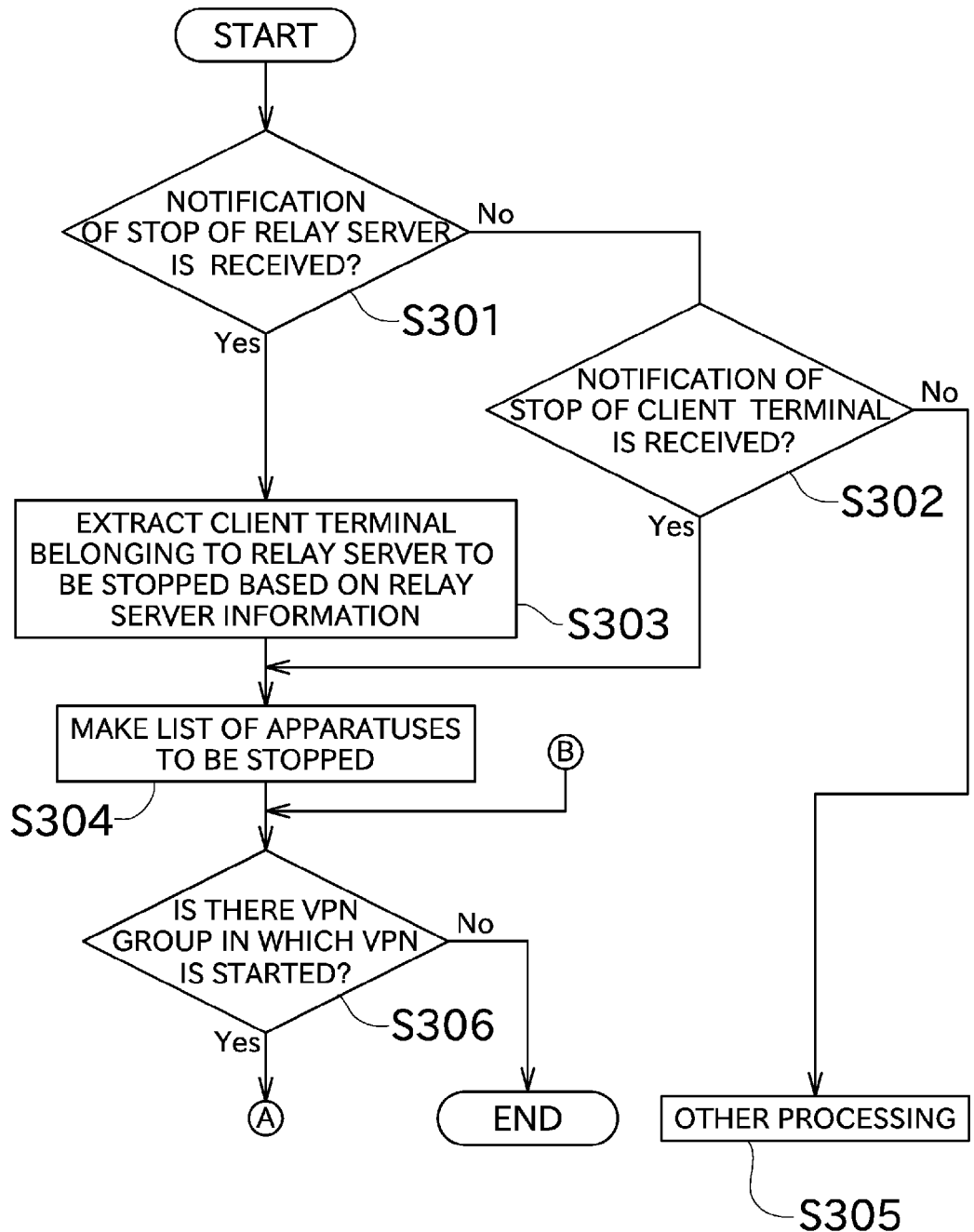
FIG. 18 is a flowchart showing the former half of a process performed when a notification that a routing apparatus stops is given.
Figure 19:
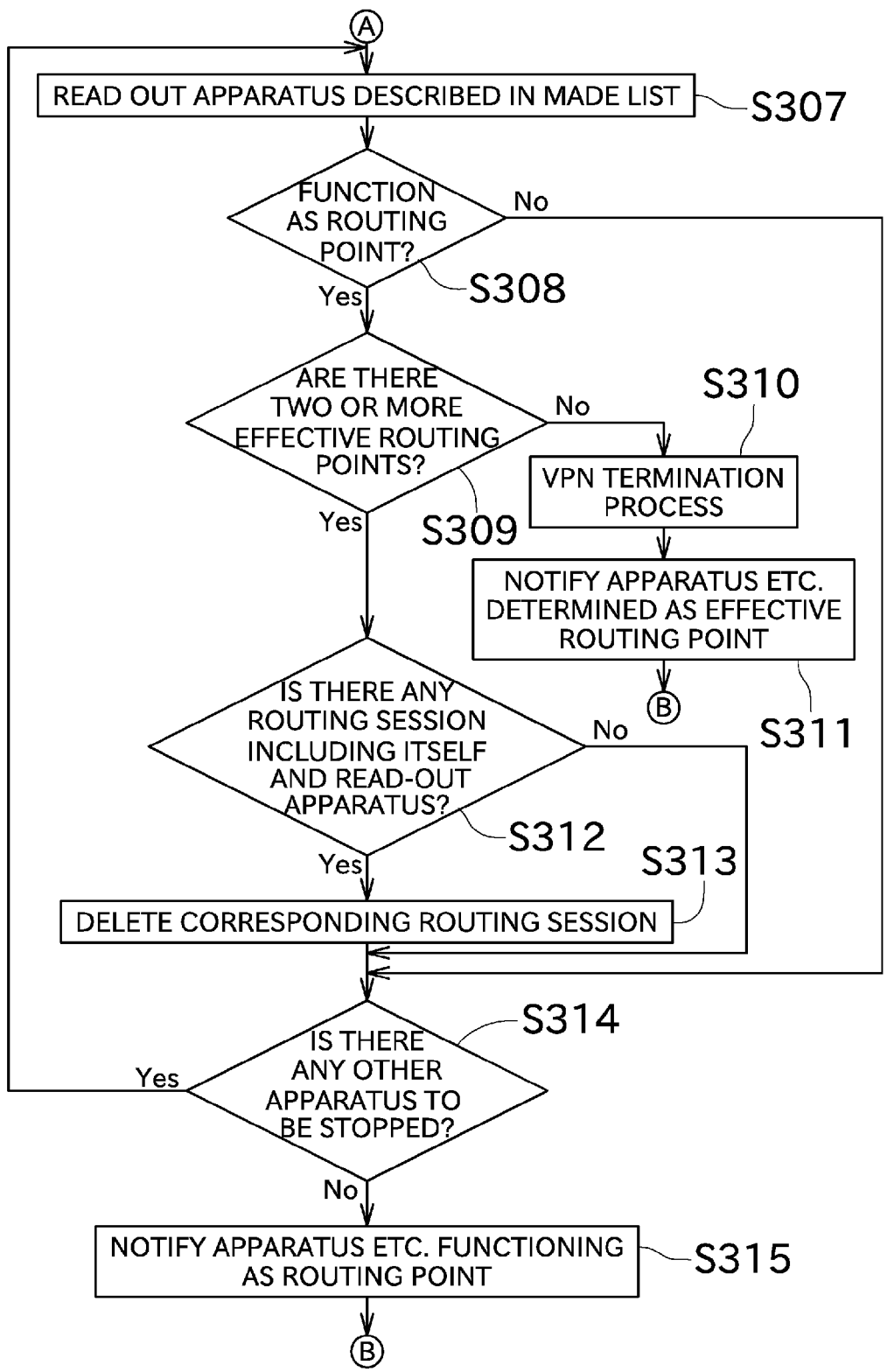
FIG. 19 is a flowchart showing the latter half of the process performed when the notification that the routing apparatus stops is given.

Next, a communication process performed when the communication apparatus stops functioning as a VPN entity after the VPN is started will be described with reference to FIGS. 18 and 19. FIGS. 18 and 19 are flowcharts showing a process performed when a notification of stop of the communication apparatus is received.

A case where functioning as the VPN entity is stopped includes various situations conceivable. For example, a situation where the apparatus leaves the VPN group, a situation where the apparatus leaves the relay group, and a situation where the apparatus loses the ability to communicate with other apparatuses due to a network failure or the like, are conceivable. In the following, a process performed when the client terminal 11 receives the notification will be described as a representative.

The client terminal 11 determines whether the notification received from another apparatus is a notification of stopping of the relay server, a notification of stopping of the client terminal, or other notifications (S301, S302). In a case where the notification is the notification of stopping of the relay server, the client terminal 11 refers to the relay server information stored in the client terminal 11 itself, to thus extract a client terminal that belongs to this relay server (S303). Then, the client terminal 11 stores this relay server and this client terminal in a list of apparatuses to be stopped (S304).

In a case where the notification is the notification of stopping of the client terminal, the client terminal 11 stores this client terminal in the list of apparatuses to be stopped (S304). In a case where the notification is neither the notification of stopping of the relay server nor the notification of stopping of the client terminal, the client terminal 11 performs processing corresponding to a content of the notification as appropriate (S305).

After the list of apparatuses to be stopped is made in S304, the client terminal 11 determines whether or not there is any VPN group in which the VPN is started and processing of S307 to S315 which will be described later is not completed (S306). In a case where such a VPN group does not exist, this series of processing is terminated.

In a case where a VPN group that satisfies the conditions exists, the client terminal 11 reads out one apparatus described in the list made in S304 (S307). Then, the client terminal 11 determines whether or not the read-out apparatus (apparatus to be stopped) is functioning as a routing point in the VPN that is currently executed (S308).

In a case where the read-out apparatus is functioning as a routing point, the client terminal 11 determines whether or not two or more effective routing points remain even if this routing point actually stops (S309). In a case where the number of remaining routing points is one or less, there is no significance in continuing the VPN, and therefore the client terminal 11 performs a VPN stop process (S310). Then, the client terminal 11 provides a notification to the user (S311) by, for example, displaying on a display the identification information of the one routing apparatus that has been determined as an effective routing point in S309 and the name of a partner that this routing apparatus could designate as a packet destination. Then, the process returns to S306.

In a case where two or more effective routing points remain, the client terminal 11 determines whether or not there is any routing session including the client terminal 11 itself and the routing point to be stopped, based on the VPN group information (S312). In a case where such a routing session exists, the client terminal 11 stops this routing session (S313). Then, the client terminal 11 deletes the address filter information associated with the stopped routing point.

Through the above-described processing of S307 to S313, a process with respect to the one apparatus to be stopped is completed. In a case where it is determined in S308 that the apparatus does not function as a routing point, the processing of S309 to S313 is skipped.

Then, whether or not there is a non-processed apparatus in the apparatuses described in the list is examined (S314). In a case where there is any remaining apparatus, the processing of S307 to S313 is performed with respect to each of such apparatuses. As a result, the apparatuses described in the list can be examined one by one, and in a case where the apparatus functions as a routing point, the process for stopping the routing session, or the like, can be performed.

After the process is completed for all the apparatuses in the list with respect to the VPN group, the client terminal 11 provides a notification thereof to the user by, for example, displaying on the display the identification information of the routing apparatus functioning as a routing point and the name of a partner that this routing apparatus could designate as a packet destination (S315). Then, the client terminal 11 returns to S306, and examines whether or not there is a non-processed VPN group among the VPN groups in which the VPNs are started. In a case where any non-processed VPN group exists, the processing of S307 to S315 are performed with respect to this VPN group. As a result, when there are a plurality of VPN groups in which VPNs are started, the process concerning the stop of the apparatus can be appropriately performed with respect to each of the plurality of VPN groups.

Figure 20:
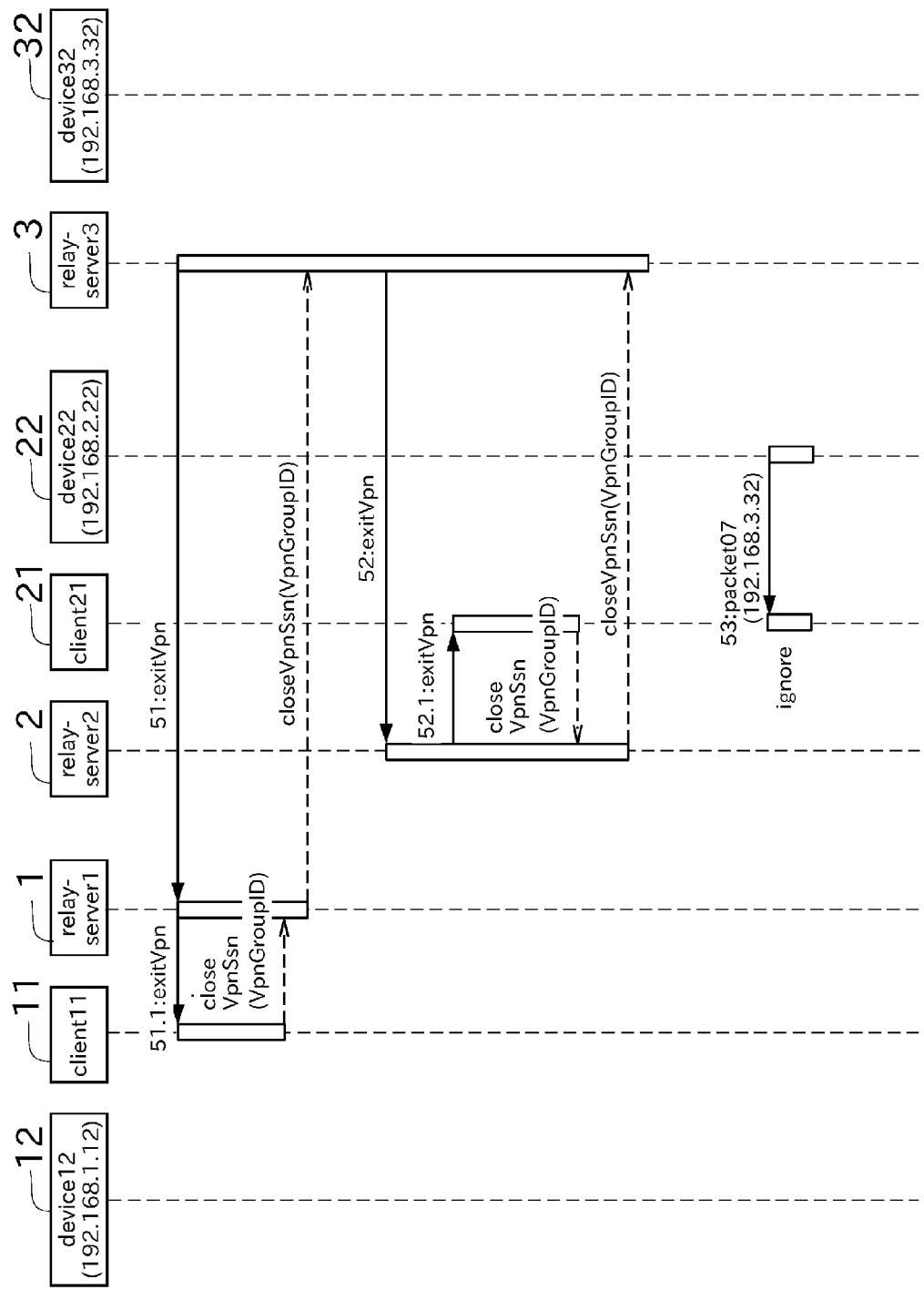
FIG. 20 is a sequence diagram showing a communication process performed when the relay server 3 leaves the VPN.

Next, a case will be considered where the relay server 3 leaves the VPN under a state where the VPN is started in the VPN group in which the client terminal 11, the client terminal 21, and the relay server 3 serve as the routing points. How the client terminal 11 operates based on the above-described flow in such a case will be specifically described. FIG. 20 is a sequence diagram showing a communication process performed when the relay server 3 leaves the VPN.

The relay server 3 provides a notification that the relay server 3 leaves the VPN group, to the other apparatuses (the client terminal 11, the relay server 1, the client terminal 21, and the relay server 2) (Sequence Numbers 51, 52: exitVpn in FIG. 20). Here, in the apparatuses that receive the notification, the same process is performed with some exception. Therefore, in the following, only the process relating mainly to the client terminal 11 will be described.

The client terminal 11 receives the notification from the relay server 3, and then determines whether or not this notification is the notification of stopping of the relay server (S301 in FIG. 19). Here, it is determined that the received notification is the one relating to the stopping of the relay server 3. Therefore, the client terminal 11 refers to the relay server information of the client terminal 11 itself (S303).

The relay server information shown in FIG. 4 indicates the client terminal 31 as a client terminal that belongs to the relay server 3 to be stopped. When the relay server 3 stops its relay function, communication not only with the relay server 3 but also with the client terminal 31 belonging thereto is disabled. Accordingly, the client terminal 11 stores the relay server 3 and the client terminal 31 in the list of apparatuses to be stopped (S304). They may be described in the list in any order, but in the description herein, the relay server 3 and the client terminal 31 are described in this order in the list of apparatuses.

Then, the client terminal 11 proceeds to the determination of S306, and examines a VPN group in which the VPN is started. As a result, it is determined that there is a VPN group (here, the VPN group in which the client terminal 11, the client terminal 21, and the relay server 3 serve as the routing points) in which the VPN is started. Accordingly, the client terminal 11 reads out, one by one, the apparatuses described in the list of apparatuses to be stopped which has been made in S304 (S307).

Since the relay server 3 and the client terminal 31 are described in this order in the list, the relay server 3 is firstly read out. In the determination of S308, the client terminal 11 refers to the VPN group information shown in FIG. 6 and detects that this relay server 3 is a routing point.

Then, the client terminal 11 determines whether or not there will be two or more effective routing points after the relay server 3 stops (S309). In the above-described case, even though the relay server 3 stops, two routing points (that is, the client terminal 11 and the client terminal 21) remain. Therefore, the VPN is not stopped, and the process proceeds to S312.

Then, the client terminal 11 makes the determination of S312. Here, the VPN group information shown in FIG. 6 indicates that there is a routing session including the client terminal 11 itself and the relay server 3. Accordingly, the client terminal 11 stops the corresponding routing session (S313; Sequence Number 51: closeVpnSsn in FIG. 20).

Then, the client terminal 11 proceeds to the determination of S314. Since there is a non-processed apparatus (client terminal 31) in the list of apparatuses to be stopped, the process returns to S307. In the processing of S307, the client terminal 31 is read out from the list. Since this client terminal 31 does not function as a routing point (S308), the processing of S309 to S313 is not performed. The client terminal 11 proceeds to the determination of S314, and it is determined that there is no longer a non-processed apparatus in the list. Then, the client terminal 11 provides a notification to the user by, for example, displaying on the display the routing apparatuses (the client terminal 11 and the client terminal 21) functioning as routing points and the names of partners (the processing apparatus 12, the processing apparatus 22, and the processing apparatus 23) that this routing apparatus could designate as a packet destination (S315). Then, the process returns to S306. Since a non-processed VPN group no longer remains, the process is terminated.

The apparatuses other than the client terminal 11 also receive the notification from the relay server 3, and perform the same process as described above. Accordingly, the routing session established between the client terminal 21 and the relay server 3 is stopped (Sequence Number 52: closeVpnSsn in FIG. 20). Each of the routing apparatuses deletes the address filter information associated with the stopped routing point. The address filter information deleted at this time is processed such that the user can no longer refer to this address filter information.

Performing the process in the above-described manner can reduce the number of routing points without performing such a complicated process that the VPN is once stopped and then started again.

A case will be described where, after the above-described process, the client terminal 21 receives a seventh packet whose destination has an IP address of (192.168.3.31) from the processing apparatus 22 (Sequence Number 53: packet07). The client terminal 21 compares the IP address of the destination against the address filter information. Since the address filter information associated with the relay server 3 has been deleted as a result of the above-described process, the client terminal 21 determines that no routing point that is able to transmit a packet to the destination is described. Therefore, the client terminal 21 does not transmit the received seventh packet to anywhere.

Figure 21:
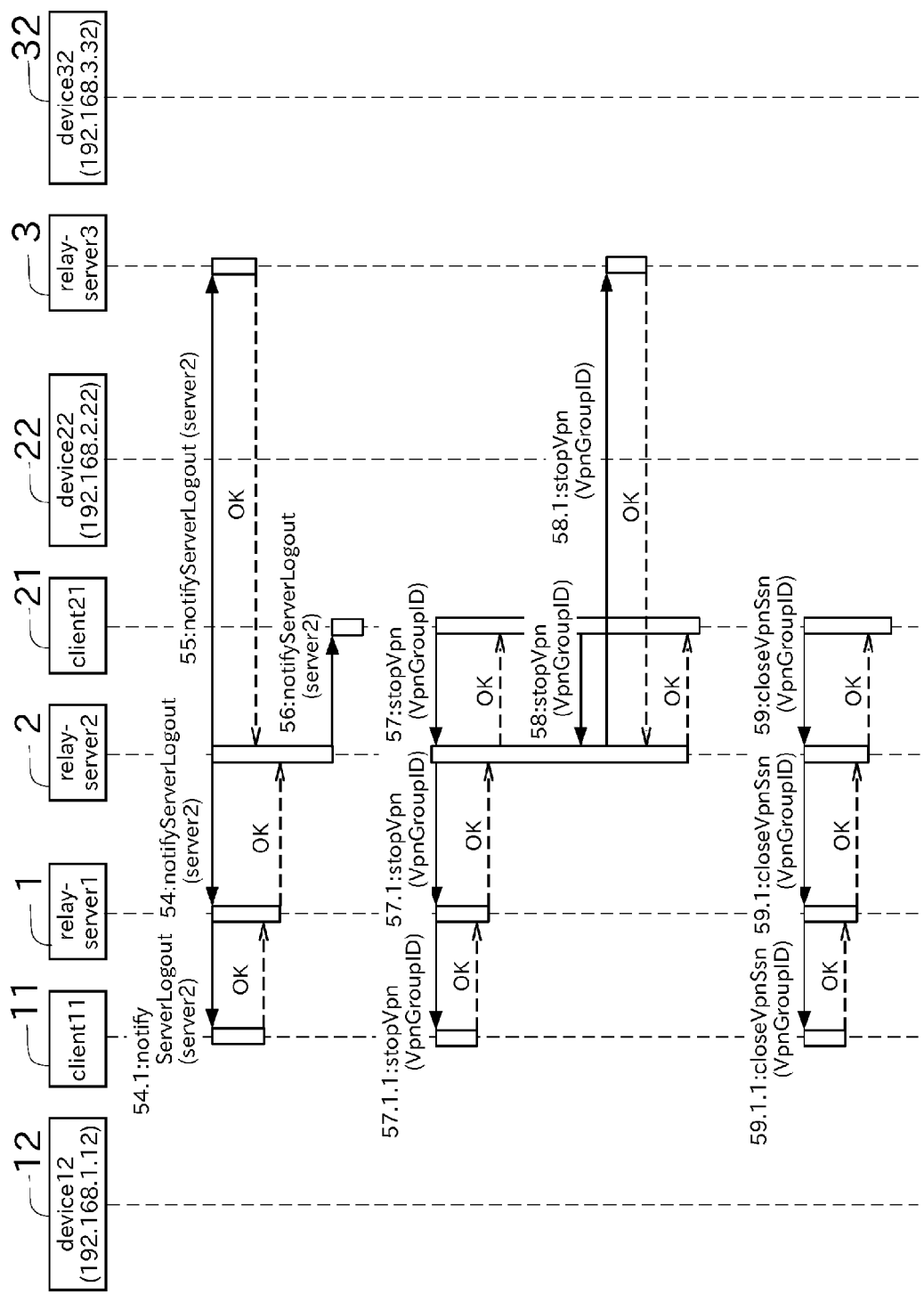
FIG. 21 is a sequence diagram showing a communication process performed when a relay server 2 stops.

Next, with reference to FIGS. 18, 19, and 21, a case will be described where, after the relay server 3 leaves the VPN as described above, the relay server 2 also logs out from the relay group. FIG. 21 is a sequence diagram showing a communication process performed when the relay server 2 stops.

Before breaking the connection, the relay server 2 provides a notification that the relay server 2 will stop, to the other apparatuses (the relay server 1, the client terminal 11, the client terminal 21, and the relay server 3) (Sequence Numbers 54, 55, 56: notifyServerLogout). The other apparatuses receive this stop, and perform the same process as described above.

In the description herein, the relay server 2 is stopped. Therefore, the client terminal 21 belonging to the relay server 2 loses the function as a routing point. Accordingly, since the relay server 3 has been already stopped, only one effective routing point, namely, only the client terminal 11, remains. Thus, there is no significance as the VPN. Hence, the apparatus having received the notification from the relay server 2 makes the determination of S309 and as a result proceeds to S310, in which a VPN termination process is performed. Additionally, the client terminal 11 provides a notification to the user by, for example, displaying on the display the routing apparatus (client terminal 11) functioning as an effective routing point and the name of a partner (processing apparatus 12) that this routing apparatus could designate as a packet destination (S311). In the following, a case where this VPN termination process is performed by the client terminal 21 will be described with reference to FIG. 21.

The client terminal 21 transmits, to the client terminal 11 and the relay server 3, the identification information of the VPN group and a notification that the VPN is terminated (Sequence Numbers 57, 58: stopVpn). Based on the identification information of the VPN group received from the client terminal 21, the client terminal 11 and the relay server 3 can recognize which VPN group is terminated.

The client terminal 21 receives a signal indicating an acknowledgement of the termination of the VPN from the client terminal 11 and the relay server 3, and then transmits a routing-session termination command to the client terminal 11 (Sequence Number 59: closeVpnSsn).

In the above-described manner, the routing session established between the client terminal 11 and the client terminal 21 can be terminated. Thus, the VPN in the VPN group is terminated.

As illustrated above, the relay server 3 of this preferred embodiment preferably includes the relay group information storage unit 51, the relay server information storage unit 52, the VPN group information storage unit 54, the address filter information storage unit 55, and the communication control unit 63. The relay group information storage unit 51 stores relay group information concerning a relay group including another relay server (relay servers 1, 2, 4) that is mutually connectable with itself (relay server 3). The relay server information storage unit 52 stores relay server information including relay server start-up information, client terminal start-up information, and client terminal registration information. The relay server start-up information concerns the relay server belonging to the relay group. The client terminal start-up information and the client terminal registration information concern a client terminal that is connected to the relay server belonging to the relay group. The VPN group information storage unit 54 relates to a VPN group configured to perform communication in a VPN via communication apparatuses that are set as routing points among the communication apparatuses included in the relay communication system 100. The VPN group information storage unit 54 stores the routing point information 542 and the routing session information 543. The routing point information 542 includes identification information of the routing apparatuses that form the VPN group. The routing session information 543 includes information of the routing apparatuses that are connected to one another. The address filter information storage unit 55 stores the address filter information indicating a partner that the routing apparatus is able to designate as a packet destination, in association with identification information of the routing apparatus. The communication control unit 63 is programmed to perform control to: cause information stored in the VPN group information storage unit 54 to be shared among the routing apparatuses; when a VPN is started in the VPN group, transmit the address filter information to the other routing apparatuses and receive the address filter information from the other routing apparatuses, and update a content stored in the address filter information storage unit 55 based on the address filter information, and establish a routing session for routing a packet based on the routing session information stored in the VPN group information storage unit 54; and, after the routing session is established, refer to a partner that the routing apparatus is able to designate as a destination based on the address filter information, and perform routing based on a content thus referred to.

This enables the relay server 3 to establish a VPN with the client terminal 11 and the client terminal 21 that are selected from the other communication apparatuses included in the relay communication system, and to share a file, for example. Additionally, when a VPN is started in the VPN group, the relay server 3 obtains the address filter information from the client terminal 11 and the client terminal 21. Accordingly, for example, even in a case where the address filter information in the client terminal 11 is changed from that of the previously-established VPN, it is possible to flexibly deal with such a change in a status and establish a VPN.

Moreover, in this preferred embodiment, in a case where, after a VPN is started in the VPN group, the address filter information associated with the identification information of the relay server 1, 2, 3, 4 itself is updated, the communication control unit 63 of the relay server 1, 2, 3, 4 is able to perform a control for providing a notification of a content of the updating.

Accordingly, after a VPN is started in the VPN group, the relay server 3 or the like is able to provide a notification that the address filter information associated with the relay server 3 is updated, to another routing apparatus or the like. This enables another routing apparatus to take appropriate measures in accordance with a change of the address filter information.

Furthermore, in this preferred embodiment, in a case where, after a VPN is started in the VPN group, it is detected that a certain routing apparatus does not function as an entity of the VPN group, the communication control unit 63 of the relay server 1, 2, 3, 4 is able to perform a control to stop a routing session established with the certain routing apparatus, without stopping the virtual private network.

Accordingly, for example, in a case where it is detected that the relay server 3 does not function as an entity of the VPN group due to a connection failure, maintenance, or the like, the other routing apparatuses can stop routing sessions established with the relay server 3, while maintaining the VPN. This makes it possible to establish a VPN capable of flexibly dealing with a change in a status.

While preferred embodiments of the present invention have been described above, the above-described configurations can be changed, for example, as follows.

A format in which the above-described relay group information, relay server information, client terminal information, VPN group information, address filter information, and the like, are stored is not limited to XML format. These kinds of information can be stored in any appropriate format.

Instead of the configuration of the above-described preferred embodiments, a configuration is also acceptable in which an external server used for communication between relay servers is placed on the internet and caused to exert a function as an SIP (Session Initiation Protocol) server so as to perform communication.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A relay server comprising:
a relay group information storage unit that stores relay group information concerning a relay group including another relay server that is mutually connectable with the relay server;
a relay server information storage unit that stores relay server information including relay server start-up information, client terminal start-up information, and client terminal registration information, the relay server start-up information concerning the relay server belonging to the relay group, the client terminal start-up information and the client terminal registration information concerning a client terminal that is connected to the relay server belonging to the relay group;
a VPN group information storage unit that relates to a VPN group including routing apparatuses that are relay servers and client terminals being set as routing points among relay servers and client terminals included in a relay communication system based on the relay group information and the relay server information, the VPN group being configured to perform communication in a virtual private network via the routing apparatuses, the VPN group information storage unit storing identification information of the routing apparatuses included in the VPN group and routing session information indicating the routing apparatuses that are connected to one another to establish a routing session;

an address filter information storage unit that stores address filter information indicating a partner that the routing apparatus is able to designate as a packet destination, in association with identification information of the routing apparatus; and a communication control unit arranged and programmed to perform control to:
cause information stored in the VPN group information storage unit to be shared among the routing apparatuses;
when a virtual private network is started in the VPN group, transmit the address filter information to the other routing apparatuses and receive the address filter information from the other routing apparatuses, and update a content stored in the address filter information storage unit based on the address filter information, and establish a routing session for routing a packet based on the routing session information stored in the VPN group information storage unit;
after the routing session is established, refer to a partner that the routing apparatus is able to designate as a destination based on the address filter information, and perform routing according to the following conditions:
in a case where a destination of a received packet is designated in the address filter information associated with identification information of the relay server, the communication control unit is programmed to transmit the packet to the destination;
in a case where a destination of a received packet is designated in the address filter information associated with identification information of the routing apparatus different from the relay server, the communication control unit is programmed to transmit the packet to the routing apparatus via a routing session established between the relay server and the routing apparatus; and
in a case where a destination of a received packet is not designated in the address filter information associated with identification information of the routing apparatuses, the communication control unit is programmed not to transmit the packet; wherein
the VPN group information storage unit stores, as the routing session information, identification information of the routing apparatus classified into start points that takes initiative to perform a communication control to establish a routing session and identification information of the routing apparatus classified into end points that receives the communication control; and
each of the routing apparatuses does not perform an initial communication control for establishing a routing session unless indicated in the routing session information to be a start point.

2. The relay server according to claim 1, wherein
in a case where a state is switched from a first state in which a first client terminal that is the routing apparatus connected to a wide area communication network via another relay server defines a VPN group into a second state in which a second client terminal that is the routing apparatus connected to the wide area communication network via the relay server defines a VPN group; and
when the first client terminal in the first state and the second client terminal in the second state have the same identification information;
in starting a virtual private network under the second state, the communication control unit is programmed to perform a control to establish a routing session between a connection partner of the first client terminal in the first state and the second client terminal via the relay server.

3. The relay server according to claim 1, wherein the address filter information storage unit is configured to store a name of a partner that the routing apparatus is able to designate as a packet destination.

4. The relay server according to claim 1, wherein in a case where, after a virtual private network is started in the VPN group, the address filter information associated with identification information of the relay server is updated, the communication control unit is programmed to perform a control to provide a notification of a content of the updating.

5. The relay server according to claim 4, wherein
in a case where, after a virtual private network is started in the VPN group, a notification that the address filter information is updated is received, the communication control unit is programmed to perform, without stopping the virtual private network, control to:
update a content stored in the address filter information storage unit based on the content of the updating; and
refer to a partner that the routing apparatus is able to designate as a destination based on an updated version of the address filter information, and perform routing.

6. The relay server according to claim 1, wherein in a case where, after a virtual private network is started in the VPN group and the relay server detects that a certain routing apparatus does not function as an entity of the VPN group, the communication control unit is programmed to perform a control to stop a routing session established with the certain routing apparatus, without stopping the virtual private network.

7. The relay server according to claim 6, wherein
the relay server information storage unit stores identification information of a second relay server that is a relay server different from the relay server, in association with identification information of a client terminal that is connected to a wide area communication network via the second relay server;
in a case where the relay server detects that communication of the second relay server stops, the communication control unit is programmed to determine whether or not there is a client terminal functioning as a routing point among client terminals connected to the wide area communication network via the second relay server, based on contents stored in the VPN group information storage unit and the relay server information storage unit;
in a case where there is any client terminal functioning as a routing point, the communication control unit is programmed to perform a control to stop a routing session established with the client terminal.

8. The relay server according to claim 6, wherein
in a case where the relay server detects that a certain routing apparatus does not function as an entity of the VPN group; and when, as a result of the certain routing apparatus not functioning as an entity of the VPN group, the number of routing apparatuses functioning as entities of the VPN group becomes one;
the communication control unit is programmed to perform a control to stop the VPN group.

9. A relay communication system comprising:
a plurality of relay servers; and
client terminals that are connectable with each other via the relay servers; wherein
each of the plurality of relay servers includes:
    a relay group information storage unit that stores relay group information concerning a relay group including another relay server that is mutually connectable with the relay server;
    a relay server information storage unit that stores relay server information including relay server start-up information, client terminal start-up information, and client terminal registration information, the relay server start-up information concerning the relay server belonging to the relay group, the client terminal start-up information and the client terminal registration information concerning the client terminal;
    a VPN group information storage unit that relates to a VPN group including routing apparatuses that are relay servers and client terminals being set as routing points among the relay servers and the client terminals, the VPN group being configured to perform communication in a virtual private network via the routing apparatuses, the VPN group information storage unit storing identification information of the routing apparatuses included in the VPN group and routing session information indicating the routing apparatuses that are connected to one another;
    an address filter information storage unit that stores address filter information indicating a partner that the routing apparatus is able to designate as a packet destination, in association with identification information of the routing apparatus; and
    a communication control unit that is programmed to perform control to:
        cause information stored in the VPN group information storage unit to be shared among the routing apparatuses;
        when a virtual private network is started in the VPN group, transmit the address filter information to the other routing apparatuses and receive the address filter information from the other routing apparatuses, and update a content stored in the address filter information storage unit based on the address filter information, and establish a routing session that enables a packet to be routed based on the routing session information stored in the VPN group information storage unit; and
        after the routing session is established, refer to a partner that the routing apparatus is able to designate as a destination based on the address filter information, and perform routing according to the following conditions:
            in a case where a destination of a received packet is designated in the address filter information associated with identification information of the relay server, the communication control unit is programmed to transmit the packet to the destination;
            in a case where a destination of a received packet is designated in the address filter information associated with identification information of the routing apparatus different from the relay server, the communication control unit is programmed to transmit the packet to the routing apparatus via a routing session established between the relay server and the routing apparatus; and
            in a case where a destination of a received packet is not designated in the address filter information associated with identification information of the routing apparatuses, the communication control unit is programmed not to transmit the packet; wherein
    the VPN group information storage unit stores, as the routing session information, identification information of the routing apparatus classified into start points that takes initiative to perform a communication control to establish a routing session and identification information of the routing apparatus classified into end points that receives the communication control; and
    each of the routing apparatuses does not perform an initial communication control for establishing a routing session unless indicated in the routing session information to be a start point.

10. The relay communication system according to claim 9, wherein in a case where, after a virtual private network is started in the VPN group, the address filter information associated with identification information of the relay server is updated, the communication control unit of the relay server is programmed to perform a control to provide a notification of a content of the updating.

11. The relay communication system according to claim 9, wherein in a case where, after a virtual private network is started in the VPN group and the relay server detects that a certain routing apparatus does not function as an entity of the VPN group, the communication control unit of the relay server is programmed to perform a control to stop a routing session established with the certain routing apparatus, without stopping the virtual private network.

* * * * *